United States Patent
Hart et al.

(10) Patent No.: US 9,863,282 B2
(45) Date of Patent: Jan. 9, 2018

(54) AUTOMATED MASS MANAGEMENT CONTROL

(71) Applicants: Katherine Hart, Batavia, OH (US); Timothy James Held, Akron, OH (US)

(72) Inventors: Katherine Hart, Batavia, OH (US); Timothy James Held, Akron, OH (US)

(73) Assignee: Echogen Power System, LLC, Akron, OH (US)

( * ) Notice: Subject to any disclaimer, the term of this patent is extended or adjusted under 35 U.S.C. 154(b) by 673 days.

(21) Appl. No.: 14/469,711

(22) Filed: Aug. 27, 2014

(65) Prior Publication Data
US 2015/0000281 A1 Jan. 1, 2015

Related U.S. Application Data

(60) Continuation of application No. 13/590,853, filed on Aug. 21, 2012, now Pat. No. 8,813,497, which is a
(Continued)

(51) Int. Cl.
*F01K 3/18* (2006.01)
*F01K 13/02* (2006.01)
(Continued)

(52) U.S. Cl.
CPC .............. *F01K 13/02* (2013.01); *F01K 3/185* (2013.01); *F01K 11/00* (2013.01); *F01K 25/103* (2013.01); *G05D 7/0617* (2013.01)

(58) Field of Classification Search
CPC ........ F01K 7/165; F01K 25/103; F01K 3/186; F01K 25/08; B60K 1/00; F25B 39/04; G05D 11/00; E21B 36/00
See application file for complete search history.

(56) References Cited

U.S. PATENT DOCUMENTS 2,575,478 A   11/1951 Wilson
2,634,375 A    4/1953 Gimbal
(Continued)

FOREIGN PATENT DOCUMENTS

CA   2794150 A1   11/2011
CN   1165238 A    11/1997
(Continued)

OTHER PUBLICATIONS

JP 2000163133A English.*
(Continued)

*Primary Examiner* — Mark Laurenzi
*Assistant Examiner* — Shafiq Mian

(57) ABSTRACT

Embodiments of the invention generally provide a heat engine system, a mass management system (MMS), and a method for regulating pressure in the heat engine system while generating electricity. In one embodiment, the MMS contains a tank fluidly coupled to a pump, a turbine, a heat exchanger, an offload terminal, and a working fluid contained in the tank at a storage pressure. The working fluid may be at a system pressure proximal an outlet of the heat exchanger, at a low-side pressure proximal a pump inlet, and at a high-side pressure proximal a pump outlet. The MMS contains a controller communicably coupled to a valve between the tank and the heat exchanger outlet, a valve between the tank and the pump inlet, a valve between the tank and the pump outlet, and a valve between the tank and the offload terminal.

6 Claims, 15 Drawing Sheets

Related U.S. Application Data continuation of application No. 13/278,705, filed on Oct. 21, 2011, now Pat. No. 8,613,195, which is a division of application No. 12/631,379, filed on Dec. 4, 2009, now Pat. No. 8,096,128.

(60) Provisional application No. 61/243,200, filed on Sep. 17, 2009.

(51) Int. Cl.
   *F01K 25/10* (2006.01)
   *F01K 11/00* (2006.01)
   *G05D 7/06* (2006.01)

(56) References Cited

U.S. PATENT DOCUMENTS

| | | |
|---|---|---|
| 2,691,280 A | 10/1954 | Albert |
| 3,095,274 A | 6/1963 | Crawford |
| 3,105,748 A | 10/1963 | Stahl |
| 3,237,403 A | 3/1966 | Feher |
| 3,277,955 A | 10/1966 | Laszlo |
| 3,401,277 A | 9/1968 | Larson |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |
| 3,791,137 A | 2/1974 | Jubb |
| 3,830,062 A | 8/1974 | Morgan et al. |
| 3,939,328 A | 2/1976 | Davis |
| 3,971,211 A | 7/1976 | Wethe |
| 3,982,379 A | 9/1976 | Gilli |
| 3,998,058 A | 12/1976 | Park |
| 4,009,575 A | 3/1977 | Hartman, Jr. |
| 4,029,255 A | 6/1977 | Heiser |
| 4,030,312 A | 6/1977 | Wallin |
| 4,049,407 A | 9/1977 | Bottum |
| 4,070,870 A | 1/1978 | Bahel |
| 4,099,381 A | 7/1978 | Rappoport |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes |
| 4,221,185 A | 9/1980 | Scholes |
| 4,233,085 A | 11/1980 | Roderick |
| 4,236,869 A | 12/1980 | Laurello |
| 4,248,049 A | 2/1981 | Briley |
| 4,257,232 A | 3/1981 | Bell |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,372,125 A | 2/1983 | Dickenson |
| 4,384,568 A | 5/1983 | Palmatier |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. |
| 5,164,020 A | 11/1992 | Wagner |
| 5,176,321 A | 1/1993 | Doherty |
| 5,203,159 A | 4/1993 | Koizumi |
| 5,228,310 A | 7/1993 | Vandenberg |
| 5,291,960 A | 3/1994 | Brandenburg |
| 5,320,482 A | 6/1994 | Palmer et al. |
| 5,335,510 A | 8/1994 | Rockenfeller |
| 5,358,378 A | 10/1994 | Holscher |
| 5,360,057 A | 11/1994 | Rockenfeller |
| 5,360,139 A * | 11/1994 | Goode .................. F17C 5/007 141/18 |
| 5,392,606 A | 2/1995 | Labinov |
| 5,440,882 A | 8/1995 | Kalina |
| 5,444,972 A | 8/1995 | Moore |
| 5,483,797 A | 1/1996 | Rigal et al. |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,570,578 A | 11/1996 | Saujet |
| 5,588,298 A | 12/1996 | Kalina |
| 5,600,967 A | 2/1997 | Meckler |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,738,164 A | 4/1998 | Hildebrand |
| 5,754,613 A | 5/1998 | Hashiguchi |
| 5,771,700 A | 6/1998 | Cochran |
| 5,789,822 A | 8/1998 | Calistrat |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,894,836 A | 4/1999 | Wu |
| 5,899,067 A | 5/1999 | Hageman |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,973,050 A | 10/1999 | Johnson |
| 6,037,683 A | 3/2000 | Lulay |
| 6,041,604 A | 3/2000 | Nicodemus |
| 6,058,930 A | 5/2000 | Shingleton |

(56) References Cited

U.S. PATENT DOCUMENTS

| | | | |
|---|---|---|---|
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,282,900 B1 | 9/2001 | Bell |
| 6,282,917 B1 | 9/2001 | Mongan |
| 6,295,818 B1 | 10/2001 | Ansley |
| 6,299,690 B1 | 10/2001 | Mongeon |
| 6,341,781 B1 | 1/2002 | Matz |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,539,720 B2 | 4/2003 | Rouse |
| 6,539,728 B2 | 4/2003 | Korin |
| 6,571,548 B1 | 6/2003 | Bronicki |
| 6,581,384 B1 | 6/2003 | Benson |
| 6,598,397 B2 | 7/2003 | Hanna |
| 6,619,336 B2 * | 9/2003 | Cohen | F17C 5/06 141/18 |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 * | 5/2004 | Kalina | F01K 25/065 60/649 |
| 6,739,142 B2 | 5/2004 | Korin |
| 6,751,959 B1 | 6/2004 | McClanahan et al. |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,553 B2 | 4/2006 | Johnston et al. |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 * | 10/2009 | Kalina | F01K 25/06 165/DIG. 185 |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,972,529 B2 | 7/2011 | Machado |
| 7,979,165 B2 * | 7/2011 | Gotoh | G01F 1/6847 137/2 |
| 7,997,076 B2 | 8/2011 | Ernst |
| 8,096,128 B2 | 1/2012 | Held et al. |
| 8,099,198 B2 | 1/2012 | Gurin |
| RE43,288 E * | 4/2012 | Sund | G01F 1/8413 137/209 |
| 8,146,360 B2 * | 4/2012 | Myers | F01D 15/10 60/618 |
| 8,281,593 B2 | 10/2012 | Held |
| 8,419,936 B2 | 4/2013 | Berger et al. |
| 8,555,912 B2 * | 10/2013 | Woolley | F01K 25/10 137/13 |
| 8,794,002 B2 * | 8/2014 | Held | F01K 3/185 60/651 |
| 9,031,705 B2 * | 5/2015 | Mlcak | F01K 13/02 166/145 |
| 2001/0015061 A1 | 8/2001 | Viteri et al. |
| 2001/0020444 A1 | 9/2001 | Johnston |
| 2001/0030952 A1 | 10/2001 | Roy |
| 2002/0029558 A1 | 3/2002 | Tamaro |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |

(56) References Cited

U.S. PATENT DOCUMENTS

| | | |
|---|---|---|
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2005/0022963 A1 | 2/2005 | Garrabrant et al. |
| 2005/0056001 A1 | 3/2005 | Frutschi |
| 2005/0096676 A1 | 5/2005 | Gifford, III et al. |
| 2005/0109387 A1 | 5/2005 | Marshall |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II et al. |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0163625 A1 | 7/2008 | O'Brien |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers et al. |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland et al. |
| 2009/0180903 A1 | 7/2009 | Martin et al. |
| 2009/0205892 A1 | 8/2009 | Jensen et al. |
| 2009/0211251 A1 | 8/2009 | Petersen et al. |
| 2009/0211253 A1 | 8/2009 | Radcliff et al. |
| 2009/0266075 A1 | 10/2009 | Westmeier et al. |
| 2009/0293503 A1 | 12/2009 | Vandor |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287934 A1 | 11/2010 | Glynn et al. |
| 2010/0300093 A1 | 12/2010 | Doty |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopecek et al. |
| 2011/0259010 A1 | 10/2011 | Bronicki et al. |
| 2011/0299972 A1 | 12/2011 | Morris |
| 2011/0308253 A1 | 12/2011 | Ritter |
| 2012/0047892 A1 | 3/2012 | Held et al. |
| 2012/0067055 A1 | 3/2012 | Held |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0174558 A1 | 7/2012 | Gurin |
| 2012/0186219 A1 | 7/2012 | Gurin |
| 2012/0247134 A1 | 10/2012 | Gurin |
| 2012/0247455 A1 | 10/2012 | Gurin et al. |
| 2012/0261090 A1 | 10/2012 | Durmaz et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0113221 A1 | 5/2013 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 19906087 A1 | 8/2000 |
| DE | 10052993 A1 | 5/2002 |
| EP | 1977174 A2 | 10/2008 |
| EP | 1998013 A2 | 12/2008 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 A1 | 1/2013 |
| GB | 856985 A | 12/1960 |
| GB | 2010974 A | 7/1979 |
| GB | 2075608 A | 11/1981 |
| JP | 58-193051 A | 11/1983 |
| JP | 60-040707 A | 3/1985 |
| JP | 61-152914 A | 7/1986 |
| JP | 01-240705 A | 9/1989 |
| JP | 05-321612 A | 12/1993 |
| JP | 06-331225 A | 11/1994 |
| JP | 08-028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11-270352 | 5/1999 |

(56) References Cited

FOREIGN PATENT DOCUMENTS

| JP | 2000163133 A | * | 6/2000 |
|---|---|---|---|
| JP | 2000-257407 A | | 9/2000 |
| JP | 2001-193419 A | | 7/2001 |
| JP | 2002-097965 A | | 4/2002 |
| JP | 2003-529715 A | | 10/2003 |
| JP | 2004-239250 A | | 8/2004 |
| JP | 2004-332626 A | | 11/2004 |
| JP | 2005-030727 A | | 2/2005 |
| JP | 2005-533972 A1 | | 11/2005 |
| JP | 2006-037760 A | | 2/2006 |
| JP | 2006-177266 A | | 7/2006 |
| JP | 2007-198200 A | | 9/2007 |
| JP | 4343738 B2 | | 10/2009 |
| JP | 2011-017268 A | | 1/2011 |
| KR | 10-0191080 | | 6/1999 |
| KR | 10-20070086244 A | | 8/2007 |
| KR | 10-0766101 B1 | | 10/2007 |
| KR | 10-0844634 A | | 7/2008 |
| KR | 10-20100067927 A | | 6/2010 |
| KR | 10-20110018769 A | | 2/2011 |
| KR | 1069914 B1 | | 9/2011 |
| KR | 1103549 B1 | | 1/2012 |
| KR | 10-20120058582 A | | 6/2012 |
| KR | 2012-0068670 A | | 6/2012 |
| KR | 2012-0128753 A | | 11/2012 |
| KR | 2012-0128755 A | | 11/2012 |
| WO | 1991-005145 A1 | | 4/1991 |
| WO | 1996-009500 A1 | | 3/1996 |
| WO | 00-71944 A1 | | 11/2000 |
| WO | 2001-044658 A1 | | 6/2001 |
| WO | 2006-060253 A1 | | 6/2006 |
| WO | 2006-137957 A1 | | 12/2006 |
| WO | 2007-056241 A2 | | 5/2007 |
| WO | 2007-079245 A2 | | 7/2007 |
| WO | 2007-082103 A2 | | 7/2007 |
| WO | 2007-112090 A2 | | 10/2007 |
| WO | 2008-039725 A2 | | 4/2008 |
| WO | 2008-101711 A2 | | 8/2008 |
| WO | 2009-045196 A1 | | 4/2009 |
| WO | 2009-058992 A2 | | 5/2009 |
| WO | 2010-074173 A1 | | 7/2010 |
| WO | 2010-083198 A1 | | 7/2010 |
| WO | 2010-121255 A1 | | 10/2010 |
| WO | 2010-126980 A2 | | 11/2010 |
| WO | 2010-151560 A1 | | 12/2010 |
| WO | 2011-017450 A2 | | 2/2011 |
| WO | 2011-017476 A1 | | 2/2011 |
| WO | 2011-017599 A1 | | 2/2011 |
| WO | 2011-034984 A1 | | 3/2011 |
| WO | 2011-094294 A2 | | 8/2011 |
| WO | 2011-119650 A2 | | 9/2011 |
| WO | 2012-074905 A2 | | 6/2012 |
| WO | 2012-074907 A2 | | 6/2012 |
| WO | 2012-074911 A2 | | 6/2012 |
| WO | 2012-074940 A2 | | 6/2012 |
| WO | 2013-055391 A1 | | 4/2013 |
| WO | 2013-059687 A1 | | 4/2013 |
| WO | 2013-059695 A1 | | 4/2013 |
| WO | 2013-070249 A1 | | 5/2013 |
| WO | 2013-074907 A1 | | 5/2013 |

OTHER PUBLICATIONS

Alpy, N., et al., "French Atomic Energy Commission views as regards to SCO2 Cycle Development priorities and related R&D approach", Presentation, Symposium on SCO2 Power Cycles, Apr. 29-30, 2009, Troy, NY, 20 pages.
Angelino, G. and Invernizzi, C.M., "Carbon Dioxide Power Cycles using Liquid Natural Gas as Heat Sink", Applied Thermal Engineering, Mar. 3, 2009, 43 pages.
Bryant, John C., Saari, Henry, and Zanganeh, Kourosh, "An Analysis and Comparison of the Simple and Recompression Supercritical CO2 Cycles", Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.
Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.
Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.
Chen, Yang, "Thermodynamic Cycles Using Carbon Dioxide as Working Fluid", Doctoral Thesis, School of Industrial Engineering and Management, Stockholm, Oct. 2011, 150 pages, (3 parts).
Chinese Search Report for Application No. 201080035382.1, 2 pages.
Chinese Search Report for Application No. 201080050795.7, 2 pages.
Chordia, Lalit, "Optimizing Equipment for Supercritical Applications", Thar Energy LLC, Supercritical CO2 Power Cycle Symposium, May 24-25, 2011, Boulder, CO, 7 pages.
Combs, Osie V., "An Investigation of the Supercritical CO2 Cycle (Feher cycle) for Shipboard Application", Massachusetts Institute of Technology, May 1977, 290 pages.
Di Bella, Francis A., "A Gas Turbine Engine Exhaust Waste Heat Recovery Navy Shipboard Module Development", Supercritical CO2 Power Cycle Symposium, May 24-25, 2011, Boulder, CO, 8 pages.
Dostal, V., et al., "A Supercritical Carbon Dioxide Cycle for Next Generation Nuclear Reactors", Mar. 10, 2004, 326 pages, (7 parts).
Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, Troy, NY, 8 pages.
Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.
Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.
Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.
Feher, E. G. et al., "Investigation of Supercritical (Feher) Cycle", Astropower Laboratory, Missile & Space Systems Division, Oct. 1968, 152 pages.
Fuller, Robert L. and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.
Fuller, Robert L. and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.
Gokhstein, D.P. and Verkhivker, G.P., "Use of Carbon Dioxide as a Heat Carrier and Working Substance in Atomic Power Stations", Soviet Atomic Energy, Apr. 1969, vol. 26, Issue 4, pp. 430-432.
Gokhstein, D.P., Taubman, E.I., Konyaeva, G.P., "Thermodynamic Cycles of Carbon Dioxide Plant with an Additional Turbine After the Regenerator", Energy Citations Database, Mar. 1973, 1 page, Abstract only.
Hejzlar, P., et al., "Assessment of Gas Cooled Gas Reactor with Indirect Supercritical CO2 Cycle", Massachusetts Institute of Technology, Jan. 2006, 10 pages.
Hoffman, John R. and Feher, E.G., "150 kwe Supercritical Closed Cycle System", Transactions of the ASME, Jan. 1971, pp. 70-80.
Jeong, Woo Seok, et al., "Performance of S-CO2 Brayton Cycle with Additive Gases for SFR Application", Korea Advanced Insti-

(56) References Cited

OTHER PUBLICATIONS tute of Science and Technology, Supercritical CO2 Power Cycle Symposium, May 24-25, 2011, Boulder, CO, 5 pages.
Johnson, Gregory A. & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.
Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, 1 page, (Abstract only).
Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.
Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.
Kulhanek, Martin and Dostal, Vaclav, "Supercritical Carbon Dioxide Cycles Thermodynamic Analysis and Comparison", Abstract, Faculty Conference held in Prague, Mar. 24, 2009, 13 pages.
Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.
Moisseytsev, Anton and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.
Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.
Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.
Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Muto, Yasushi and Kato, Yasuyoshi, "Optimal Cycle Scheme of Direct Cycle Supercritical CO2 Gas Turbine for Nuclear Power Generation Systems", International Conference on Power Engineering—2007, Oct. 23-27, 2007, Hangzhou, China, pp. 86-87.
Noriega, Bahamonde J.S., "Design Method for S-CO2 Gas Turbine Power Plants", Master of Science Thesis, Delft University of Technology, Oct. 2012, 122 pages, (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang, et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et al., "Supercritical CO2 Direct Cycle Gas Fast Reactor (SC-GFR) Concept", Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.

PCT/US2006/049623—Written Opinion of ISA dated Jan. 4, 2008, 4 pages.
PCT/US2007/001120—International Search Report dated Apr. 25, 2008, 7 pages.
PCT/US2007/079318—International Preliminary Report on Patentability dated Jul. 7, 2008, 5 pages.
PCT/US2010/0131614—International Search Report dated Jul. 12, 2010, 3 pages.
PCT/US2010/031614—International Preliminary Report on Patentability dated Oct. 27, 2011, 9 pages.
PCT/US2010/039559—International Preliminary Report on Patentability dated Jan. 12, 2012, 7 pages.
PCT/US2010/039559—Notification of Transmittal of the International Search Report and the Written Opinion of the International Searching Authority, or the Declaration dated Sep. 1, 2010, 6 pages.
PCT/US2010/044476—International Search Report dated Sep. 29, 2010, 23 pages.
PCT/US2010/044681—International Search Report and Written Opinion dated Oct. 7, 2010, 10 pages.
PCT/US2010/044681—International Preliminary Report on Patentability dated Feb. 16, 2012, 9 pages.
PCT/US2010/049042—International Search Report and Written Opinion dated Nov. 17, 2010, 11 pages.
PCT/US2010/049042—International Preliminary Report on Patentability dated Mar. 29, 2012, 18 pages.
PCT/US2011/029486—International Preliminary Report on Patentability dated Sep. 25, 2012, 6 pages.
PCT/US2011/029486—International Search Report and Written Opinion dated Nov. 16, 2011, 9 pages.
PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062198—Extended European Search Report dated May 6, 2014, 9 pages.
PCT/US2011/062201—International Search Report and Written Opinion dated Jun. 26, 2012, 9 pages.
PCT/US2011/062201—Extended European Search Report dated May 28, 2014, 8 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/013154—International Search Report dated May 23, 2014, 4 pages.
PCT/US2014/013170—Notification of Transmittal of the International Search Report and the Written Opinion of the International Searching Authority, or the Declaration, dated May 9, 2014, 12 pages.
PCT/US2014/023026—Notification of Transmittal of the International Search Report and the Written Opinion of the International Searching Authority, or the Declaration dated Jul. 22, 2014, 11 pages.

(56) References Cited

OTHER PUBLICATIONS

PCT/US2014/023990—Notification of Transmittal of the International Search Report and the Written Opinion of the International Searching Authority, or the Declaration dated Jul. 17, 2014, 10 pages.

PCT/US2014/026173—Notification of Transmittal of the International Search Report and the Written Opinion of the International Searching Authority, or the Declaration dated Jul. 9, 2014, 10 pages.

Persichilli, Michael, et al., "Supercritical CO2 Power Cycle Developments and Commercialization: Why SCO2 can Displace Steam", Echogen Power Systems, LLC, Power-Gen India & Central Asia 2012, Apr. 19-21, 2012, New Delhi, India, 15 pages.

Renz, Manfred, "The New Generation Kalina Cycle", Contribution to the Conference: Electricity Generation from Enhanced Geothermal Systems, Sep. 14, 2006, Strasbourg, France, 18 pages.

Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.

San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.

Sarkar, J. and Bhattacharyya, Souvik, "Optimization of Recompression S-CO2 Power Cycle with Reheating", Energy Conversion and Management 50, May 17, 2009, pp. 1939-1945.

Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.

Tom, Samsun Kwok Sun, "The Feasibility of Using Supercritical Carbon Dioxide as a Coolant for the Candu Reactor", The University of British Columbia, Jan. 1978, 156 pages.

VGB Powertech Service GMBH, "CO2 Capture and Storage", A VGB Report on the State of the Art, Aug. 25, 2004, 112 pages.

Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.

Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.

Wright, Steven A., et al., "Modeling and Experimental Results for Condensing Supercritical CO2 Power Cycles", Sandia Report, Jan. 2011, 47 pages.

Wright, Steven A., et al., "Supercritical CO2 Power Cycle Development Summary at Sandia National Laboratories", May 24-25, 2011, 1 pages, (Abstract Only).

Wright, Steven, "Mighty Mite", Mechanical Engineering, Jan. 2012, pp. 41-43.

Yoon, Ho Joon, et al., "Preliminary Results of Optimal Pressure Ratio for Supercritical CO2 Brayton Cycle Coupled with Small Modular Water Cooled Reactor", Presentation, Korea Advanced Institute of Science and Technology and Khalifa University of Science, Technology and Research, Boulder, CO, May 25, 2011, 18 pages.

Yoon, Ho Joon, et al., "Preliminary Results of Optimal Pressure Ratio for Supercritical CO2 Brayton Cycle Coupled with Small Modular Water Cooled Reactor", Paper, Korea Advanced Institute of Science and Technology and Khalifa University of Science, Technology and Research, May 24-25, 2011, Boulder, CO, 7 pages.

\* cited by examiner

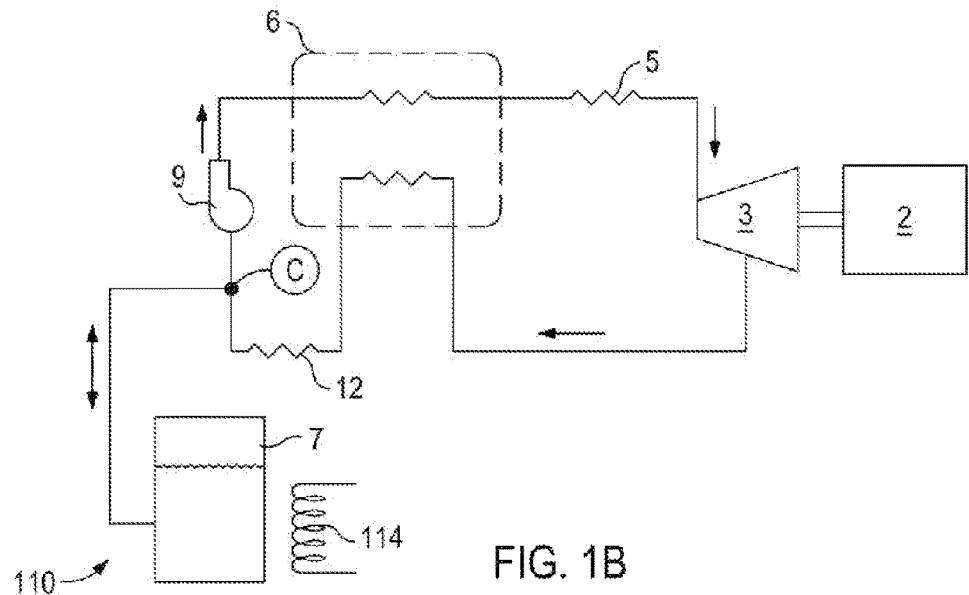
FIG. 1B
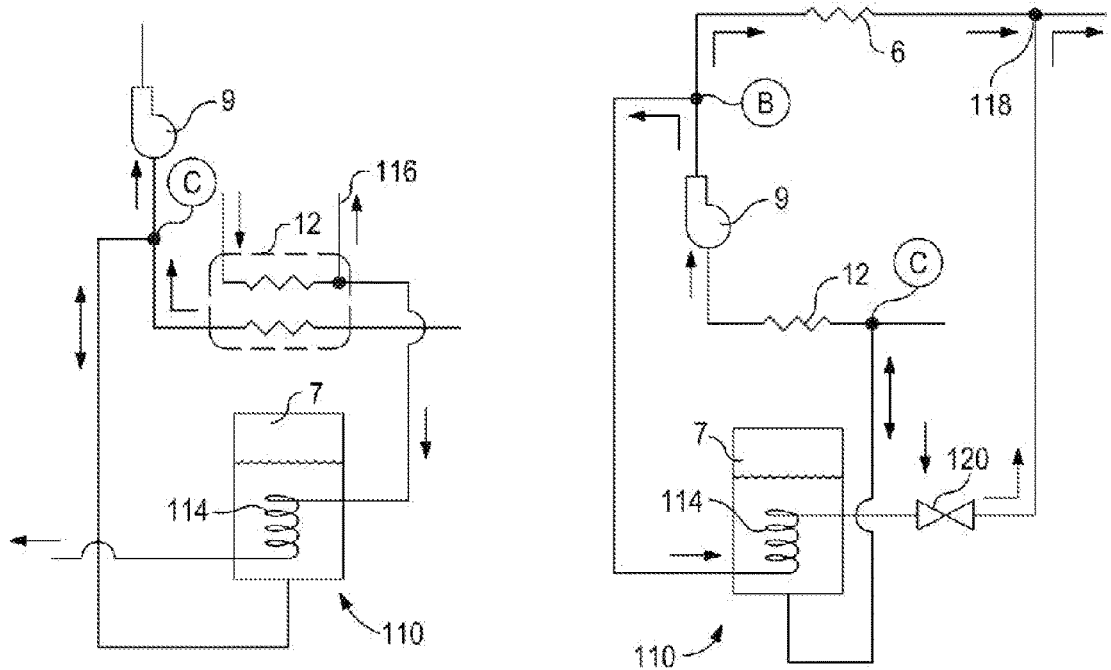
FIG. 1C
FIG. 1D

AUTOMATED MASS MANAGEMENT CONTROL

CROSS-REFERENCE TO RELATED APPLICATIONS

This application is a continuation of U.S. application Ser. No. 13/590,853, filed Aug. 21, 2012, which is a continuation-in-part of U.S. application Ser. No. 13/278,705, filed Oct. 21, 2011, now issued as U.S. Pat. No. 8,613,195, which is a divisional of U.S. application Ser. No. 12/631,379, filed Dec. 4, 2009, now issued as U.S. Pat. No. 8,096,128, which claims the benefit of U.S. Prov. Appl. No. 61/243,200, filed Sep. 17, 2009, the contents of which are herein incorporated by reference to the extent consistent with the present disclosure.

BACKGROUND

Heat is often created as a byproduct of industrial processes and is discharged when liquids, solids, and/or gasses that contain such heat are exhausted into the environment or otherwise removed from the process. This heat removal may be necessary to avoid exceeding safe and efficient operating temperatures in the industrial process equipment or may be inherent as exhaust in open cycles. If the heat is not recovered from this exhaust, however, it represents inefficiency, as thermal energy is lost. Accordingly, industrial processes often use heat exchanging devices to recover the heat and recycle much of it back into the process or provide combined cycles, utilizing this heat to power secondary heat engines.

Such recovery can be significantly limited by a variety of factors. For example, the exhaust stream may be reduced to low-grade (e.g., low-temperature) heat, from which economical energy extraction is difficult, or the heat may otherwise be difficult to recover. Accordingly, the unrecovered heat is discharged as "waste heat"—typically via a stack or through exchange with water or another cooling medium. In other settings, heat is available from renewable sources of thermal energy, such as heat from the sun or geothermal sources, which may be concentrated or otherwise manipulated. Heat provided by these and other thermal energy sources is also intended to fall within the definition of "waste heat"—as that term is used herein.

Such waste heat can be utilized by turbine generator systems arranged as part of thermodynamic cycles, such as the Rankine cycle, to convert heat into work. Furthermore, supercritical carbon dioxide power cycles may be useful in applications where conditions are not conducive to the use of more-conventional working fluids and/or to increase efficiency when compared to such working fluids. Supercritical carbon dioxide working fluid provides numerous thermodynamic advantages. For example, by using a supercritical fluid, the temperature glide of a process heat exchanger can be more readily matched.

In these cycles, it is important to manage the low-side pressure upstream from the system pump. If the low-side pressure drops below the saturation point of the working fluid, cavitation can occur, which can damage the pump. On the other hand, the pressure ratio between the low side and the high side is directly related to the power generation of the system, with efficiency and power generation being highly sensitive to changes in the low-side pressure, even as compared to the high-side.

Accordingly, it is desirable to maintain the lowest possible, safe low-side pressure. In the past, systems of vents, pressure containment vessels, and other equipment have been used as mass management systems, with a good degree of success, to maintain desired operation parameters. However, these systems often allow pressure to be vented to the system on nearly a constant basis. This represents wasted working fluid, which must be replenished on a periodic basis, thereby increasing operating costs.

Therefore, there is a needed for a heat engine system, a mass management system, a method for regulating pressure in the heat engine system, and a method for generating electricity, whereby the systems and methods provide maintaining a desired range of pressure within the system, avoiding on-going ventilation of the process fluid, and maximizing the efficiency of the heat engine system to generate electricity.

SUMMARY

Embodiments of the invention generally provide a heat engine system, a mass management system (MMS) for the heat engine system, a method for regulating pressure in the heat engine system, and a method for generating electricity via the heat engine system. The heat engine system, the MMS, the method for regulating pressure, and the method for generating electricity are configured to efficiently generate valuable electrical energy from thermal energy, such as a heated stream (e.g., a waste heat stream or other heated stream). The heat engine system utilizes a working fluid in a supercritical state (e.g., sc-$CO_2$) and/or a subcritical state (e.g., sub-$CO_2$) contained within a working fluid circuit for capturing or otherwise absorbing thermal energy of the waste heat stream with one or more heat exchangers. The thermal energy is transformed to mechanical energy by a power turbine and subsequently transformed to electrical energy by the power generator coupled to the power turbine. The heat engine system generally contains several integrated sub-systems managed by a process control system for maximizing the efficiency of the heat engine system while generating electricity.

In one embodiment as disclosed herein, a MMS for a heat engine is provided and contains a tank fluidly coupled to a pump, a turbine, a heat exchanger, and an offload terminal, the tank being configured to contain a working fluid at a storage pressure, the working fluid being at a system pressure proximal an outlet of the heat exchanger, at a low-side pressure proximal an inlet of the pump, and at a high-side pressure proximal an outlet of the pump. The MMS further contains a first valve configured to open to allow and close to prevent fluid communication between the tank and the outlet of the heat exchanger, a second valve configured to open to allow and close to prevent fluid communication between the tank and the inlet of the pump, a third valve configured to open to allow and close to prevent fluid communication between the tank and the outlet of the pump, and a fourth valve configured to open to allow and close to prevent fluid communication between the tank and the offload terminal. Also, the MMS further contains a controller communicably coupled to the first, second, third, and fourth valves and the controller may be configured to determine an acceptable range for the low-side pressure once less than the acceptable range. The controller may be configured to close the third and fourth valves, compare the storage pressure to the low-side pressure, close the second valve if the storage pressure is less than the low-side pressure and open the second valve otherwise, and open the first valve to pressurize the tank if the storage pressure is less than or equal to the system pressure and close the first valve if the storage pressure is greater than the system pressure.

In some embodiments, the controller may be configured to determine ends of the acceptable range by adding a first safety margin to the target pressure and by subtracting a second safety margin from the target pressure. The controller may be configured to close the first, second, third, and fourth valves when the low-side pressure is within the acceptable range. Additionally, the controller may be configured to close the first valve, and compare the storage pressure to the low-side pressure when the low-side pressure is above the acceptable range and the controller may be configured to open the second valve, close the third valve, and close the fourth valve when the storage pressure is less than the low-side pressure.

In other embodiments, when the low-side pressure is above the acceptable range and the storage pressure is greater than or about equal to the low-side pressure, the controller may be configured to compare the storage pressure to the high-side pressure, open the third valve and close the second and fourth valves when the storage pressure is greater than the high-side pressure, and open the fourth valve and close the second and third valves when the storage pressure is less than or equal to the high-side pressure. In another embodiment, the MMS further contains a heater thermally coupled to the tank and communicably coupled to the controller, wherein the controller may be configured to turn on the heater to heat the tank when the low-side pressure is below the acceptable range, and the storage pressure is greater than or equal to the system pressure. The controller may be configured to turn off the heater when the low-side pressure is within or above the acceptable range and when the low-side pressure is below the acceptable range and the storage pressure is less than the system pressure.

In another embodiment described herein, a heat engine system is provided and contains a first waste heat exchanger configured to receive a waste heat stream and to transfer heat therefrom to a working fluid, a first turbine fluidly coupled to the waste heat exchanger and configured to receive the working fluid therefrom, a condenser configured to cool the working fluid, and a pump fluidly coupled to the condenser, the pump being configured to receive the working fluid from the condenser and to pressurize the working fluid. The heat engine system may further contain a first recuperator fluidly coupled to the first turbine and to the pump and configured to receive the working fluid from both, the first recuperator being configured to transfer heat from the working fluid received from the first turbine to the working fluid received from the pump and a MMS. The MMS generally contains a tank fluidly coupled to a first point downstream from the waste heat exchanger via a first valve, a second point upstream from an inlet of the pump via a second valve, a third point downstream from an outlet of the pump via a third valve, and an offload terminal via a fourth valve, the tank being configured to hold the working fluid therein at a storage pressure, a heater thermally coupled to the tank, and a controller communicably coupled to the first, second, third, and fourth valves, the controller being configured to compare a low-side pressure of the working fluid between the condenser and the pump with an acceptable range. In some examples, when the low-side pressure is below the acceptable range, the controller may be configured to close the third and fourth valves, open the second valve when the storage pressure is greater than the low-side pressure, close the second valve when the storage pressure is less than or about equal to the low-side pressure, open the first valve and turn off the heater when a system pressure of the working fluid downstream from the first waste heat exchanger is greater than the storage pressure, and close the first valve and turn on the heater when the storage pressure is greater than or about equal to the system pressure. The controller may be configured to close the first, second, third, and fourth valves and turn off the heater, when the low-side pressure is in the acceptable range.

In some embodiments, when the low-side pressure is above the acceptable range, the controller may be configured to turn off the heater and close the first valve, open the second valve and close the third and fourth valves, when the storage pressure is less than or about equal to the low-side pressure, open the third valve and close the second and fourth valves, when the storage pressure is greater than the low-side pressure and the storage pressure is greater than the high-side pressure, and open the fourth valve and close the second and third valves, when the storage pressure is greater than the low-side pressure and the storage pressure is less than or about equal to the high-side pressure. In many examples, the working fluid contains carbon dioxide and is in a supercritical phase within at least one point or portion of the heat engine system.

In other embodiments, the heat engine system further contains a second waste heat exchanger disposed in series with the first waste heat exchanger with respect to the waste heat stream, a second turbine fluidly coupled to the second waste heat exchanger and configured to receive the working fluid therefrom, and a second recuperator fluidly coupled to the second turbine and the pump and configured to receive the working fluid from both, the second recuperator being configured to transfer heat from the working fluid received from the second turbine to the working fluid received from the second pump. In some examples, the first and second recuperators may be disposed in series, such that the working fluid from the first turbine flows to the first recuperator, from the first recuperator to the second recuperator, and from the second recuperator to the condenser. Also, the heat engine system may further contain a third waste heat exchanger disposed in series with the first and second waste heat exchangers, such that waste heat traverses the first and second waste heat exchangers and then the third waste heat exchanger, the third waste heat exchanger being configured to preheat the working fluid prior to the working fluid entering the first waste heat exchanger.

In another embodiment described herein, a method for regulating pressure in a heat engine which includes sensing a low-side pressure proximal an inlet of a pump and comparing the low-side pressure to an acceptable range to determine if the low-side pressure is above the acceptable range, below the acceptable range, or within the acceptable range. The low-side pressure is below the acceptable range when the method further includes fluidly communicating a working fluid at a storage pressure from a tank to the inlet of the pump, when the storage pressure is greater than or about equal to the low-side pressure, fluidly communicating the working fluid at a system pressure from an outlet of a waste heat exchanger to the tank, when the storage pressure is less than the system pressure, and heating the working fluid in the tank with a heater when the storage pressure is greater than or equal to the system pressure.

In some embodiments, the low-side pressure is within the acceptable range when the method further includes isolating the tank from the pump and the waste heat exchanger and powering down the heater. The method may also include fluidly communicating the tank with the inlet of the pump when the low-side pressure is above the acceptable range and the storage pressure is less than the low-side pressure. In some embodiments, the low-side pressure is above the acceptable range, and the storage pressure is greater than or about equal to the low-side pressure when the method includes fluidly communicating the working fluid from the tank to an outlet of the pump, when the storage pressure is greater than a high-side pressure of the working fluid proximal the outlet of the pump and offloading the working fluid from the tank when the storage pressure is less than or about equal to the high-side pressure.

The method may also include isolating the tank from the inlet of the pump when the low-side pressure is below the acceptable range and is greater than or about equal to the storage pressure. Also, the method may include isolating the tank from the outlet of the waste heat exchanger and powering down the heater, when the low-side pressure is below the acceptable range and the storage pressure is greater than or about equal to the system pressure.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIGS. 1B-1D illustrate various conduit arrangements and working fluid flow directions for a mass management system fluidly coupled to the working fluid circuit of FIG. 1A, according to one or more embodiments disclosed.

DETAILED DESCRIPTION

Embodiments of the invention generally provide a heat engine system, a mass management system for the heat engine system, a method for regulating pressure in the heat engine system, and a method for generating electricity via the heat engine system. The heat engine system, the mass management system, the method for regulating pressure, and the method for generating electricity are configured to efficiently generate valuable electrical energy from thermal energy, such as a heated stream (e.g., a waste heat stream). The heat engine system utilizes a working fluid in a supercritical state (e.g., sc-$CO_2$) and/or a subcritical state (e.g., sub-$CO_2$) contained within a working fluid circuit for capturing or otherwise absorbing thermal energy of the waste heat stream with one or more heat exchangers. The thermal energy is transformed to mechanical energy by a power turbine and subsequently transformed to electrical energy by the power generator coupled to the power turbine. The heat engine system generally contains several integrated subsystems managed by a process control system for maximizing the efficiency of the heat engine system while generating electricity.

Figure 1A:
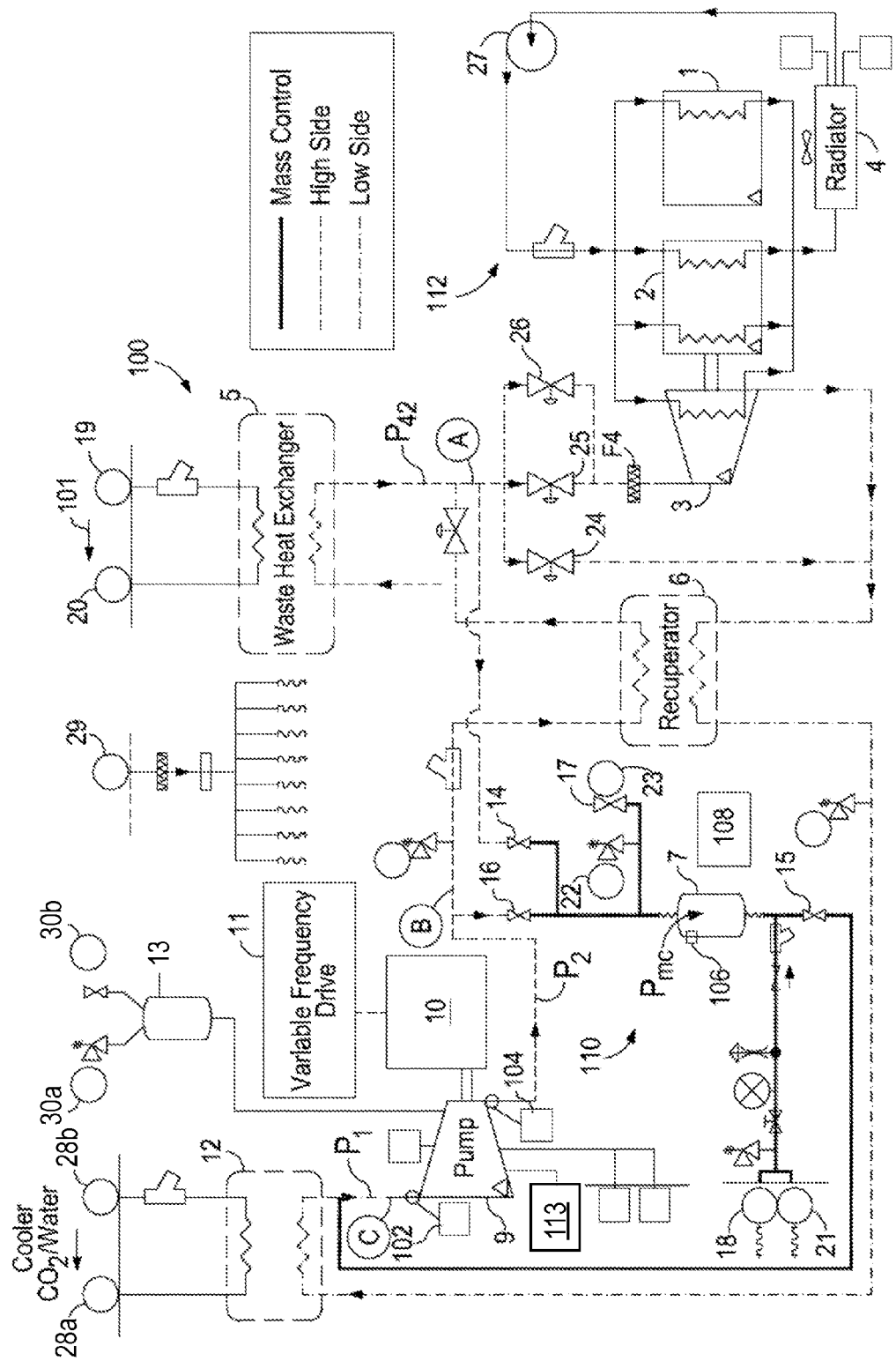
FIG. 1A is a schematic diagram of a heat to electricity system including a working fluid circuit, according to one or more embodiments disclosed.

FIG. 1A illustrates an exemplary heat engine system 100, according to one or more embodiments described. The heat engine system 100 may also be referred to as a thermal engine, a power generation device, a heat or waste heat recovery system, and/or a heat-to-electricity system. The heat engine system 100 may encompass one or more elements of a Rankine thermodynamic cycle configured to circulate a working fluid through a working fluid circuit to produce power from a wide range of thermal sources.

As will be described in greater detail below, the thermodynamic cycle may operate as a closed-loop cycle, where a working fluid circuit has a flow path defined by a variety of conduits adapted to interconnect the various components of the heat engine system 100. Although the heat engine system 100 may be considered as a closed-loop cycle, the heat engine system 100 as a whole may or may not be hermetically-sealed such that no amount of working fluid is leaked into the surrounding environment.

As illustrated, the heat engine system 100 may include a waste heat exchanger 5 in thermal communication with a waste heat source 101 via connection points 19 and 20. The waste heat source 101 may be a waste heat stream such as, but not limited to, gas turbine exhaust, process stream exhaust, or other combustion product exhaust streams, such as furnace or boiler exhaust streams. In other embodiments, the waste heat source 101 may include renewable sources of thermal energy, such as heat from the sun or geothermal sources. Accordingly, waste heat is transformed into electricity for applications ranging from bottom cycling in gas turbines, stationary diesel engine gensets, industrial waste heat recovery (e.g., in refineries and compression stations), solar thermal, geothermal, and hybrid alternatives to the internal combustion engine.

A turbine or expander 3 may be arranged downstream from the waste heat exchanger 5 and be configured to receive and expand a heated working fluid discharged from the heat exchanger 5 to generate power. To this end, the expander 3 may be coupled to a generator or an alternator 2 adapted to receive mechanical work from the expander 3 and convert that work into electrical power. In many examples, the expander 3 is a power generator and the alternator 2 is a power generator. The alternator 2 may be operably connected to power electronics 1 configured to convert the electrical power into useful electricity. In one embodiment, the alternator 2 may be in fluid communication with a cooling loop 112 having a radiator 4 and a pump 27 for circulating a cooling fluid such as water, thermal oils, and/or other suitable refrigerants. The cooling loop 112 may be configured to regulate the temperature of the alternator 2 and power electronics 1 by circulating the cooling fluid.

A recuperator 6 may be fluidly coupled to the expander 3 downstream thereof and configured to remove at least a portion of the thermal energy in the working fluid discharged from the expander 3. The recuperator 6 transmits the removed thermal energy to the working fluid proceeding towards the heat exchanger 5. A condenser or cooler 12 may be fluidly coupled to the recuperator 6 downstream thereof and configured to reduce the temperature of the working fluid even more. In one embodiment, the cooler 12 is fluidly coupled with a cooling system (not shown) that receives a cooling fluid from a supply line 28a and returns the warmed cooling fluid to the cooling system via a return line 28b. The cooling fluid may be water, carbon dioxide, or other aqueous and/or organic fluids or various mixtures thereof that is maintained at a lower temperature than the working fluid. In other embodiments, the recuperator 6 and the cooler 12 may be any device adapted to reduce the temperature of the working fluid such as, but not limited to, a direct contact heat exchanger, a trim cooler, a mechanical refrigeration unit, and/or any combination thereof. In at least one embodiment, the waste heat exchanger 5, recuperator 6, and/or the cooler 12 may include or employ one or more printed circuit heat exchange panels. Such heat exchangers and/or panels are known in the art, and are described in U.S. Pat. Nos. 6,921,518; 7,022,294; and 7,033,553, the contents of which are incorporated by reference to the extent consistent with the present disclosure.

The cooler 12 is fluidly coupled to a pump 9 that receives the cooled working fluid and pressurizes the fluid circuit to recirculate the working fluid back to the heat exchanger 5. The pump 9 is also coupled with a relief tank 13, which in turn is coupled with a pump vent 30a and relief 30b, such as for carbon dioxide. In some embodiments, the pump 9 may be driven by a motor 10 via a common rotatable shaft. The speed of the motor 10, and therefore the pump 9, may be regulated using a variable frequency drive 11. As can be appreciated, the speed of the pump 9 may control the mass flow rate of the working fluid in the fluid circuit of the heat engine system 100. In other embodiments, the pump 9 may be powered externally by another device, such as an auxiliary expansion device 113. The auxiliary expansion device 113 may be an expander or turbine configured to expand a working fluid and provide mechanical rotation to the pump 9. In at least one embodiment, the auxiliary expansion device 113 may expand a portion of the working fluid circulating in the working fluid circuit.

As indicated, the working fluid may be circulated through a "high pressure" side of the fluid circuit of the heat engine system 100 and a "low pressure" side thereof. The high pressure side generally encompasses the conduits and related components of the heat engine system 100 extending from the outlet of the pump 9 to the inlet of the turbine 3. The low pressure side of the heat engine system 100 generally encompasses the conduits and related components of the heat engine system 100 extending from the outlet of the expander 3 to the inlet of the pump 9.

In one or more embodiments, the working fluid used in the heat engine system 100 may be carbon dioxide. It should be noted that use of the term carbon dioxide is not intended to be limited to carbon dioxide of any particular type, purity, or grade. For example, industrial grade carbon dioxide may be used without departing from the scope of the disclosure. In other embodiments, the working fluid may a binary, ternary, or other working fluid blend. For example, a working fluid combination can be selected for the unique attributes possessed by the combination within a heat recovery system, as described herein. One such fluid combination includes a liquid absorbent and carbon dioxide mixture enabling the combination to be pumped in a liquid state to high pressure with less energy input than required to compress carbon dioxide. In other embodiments, the working fluid may be a combination of carbon dioxide and one or more other miscible fluids. In yet other embodiments, the working fluid may be a combination of carbon dioxide and propane, or carbon dioxide and ammonia, without departing from the scope of the disclosure.

Moreover, the term "working fluid" is not intended to limit the state or phase of matter that the working fluid is in. For example, the working fluid may be in a fluid phase, a gas phase, a supercritical phase, a subcritical state or any other phase or state at any one or more points within the heat engine system 100 or thermodynamic cycle. In one or more embodiments, the working fluid is in a supercritical state over certain portions of the heat engine system 100 (e.g., the "high pressure side"), and in a subcritical state at other portions of the heat engine system 100 (e.g., the "low pressure side"). In other embodiments, the entire thermodynamic cycle, including both the high and low pressure sides, may be operated such that the working fluid is maintained in a supercritical or subcritical state throughout the entire working fluid circuit of the heat engine system 100.

Figure 2:
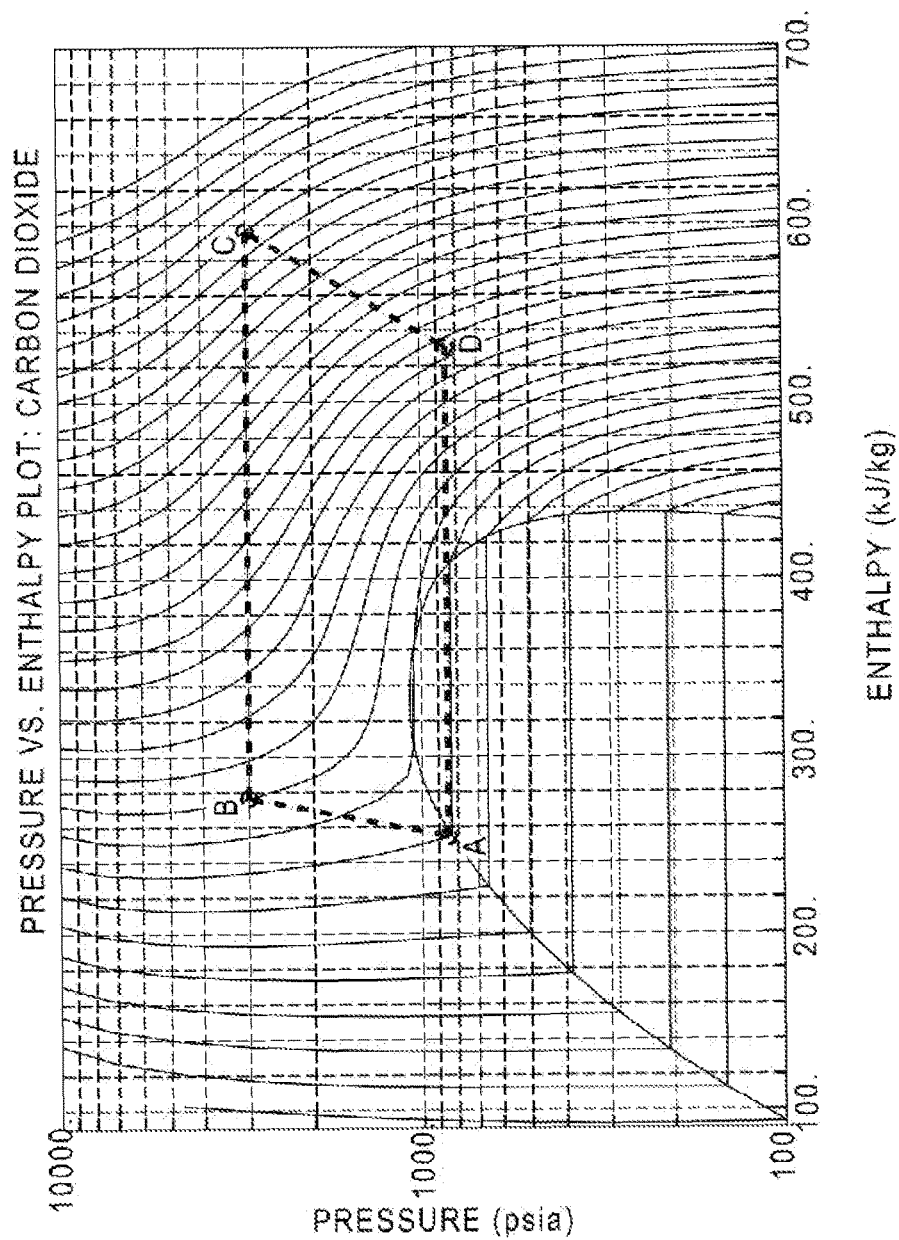
FIG. 2 is a pressure-enthalpy diagram for carbon dioxide.

The thermodynamic cycle(s) executed by the heat engine system 100 may be described with reference to a pressure-enthalpy diagram for a selected working fluid. For example, the pressure-enthalpy diagram in FIG. 2 provides the general pressure versus enthalpy for carbon dioxide. At point A, the working fluid exhibits its lowest pressure and lowest enthalpy relative to its state at any other point during the cycle. As the working fluid is compressed or otherwise pumped to a higher pressure, its state moves to point B on the pressure-enthalpy diagram. As thermal energy is introduced to the working fluid, both the temperature and enthalpy of the working fluid increase until reaching point C on the pressure-enthalpy diagram. The working fluid is then expanded through one or more mechanical processes to point D. As the working fluid discharges heat, its temperature and enthalpy are simultaneously reduced until returning to point A.

As will be appreciated, each process (e.g., A-B, B-C, C-D, D-A) need not occur as shown on the pressure-enthalpy diagram (FIG. 2), instead each step of the cycle could be achieved via a variety of ways. For example, those skilled in the art will recognize that it is possible to achieve a variety of different coordinates on the pressure-enthalpy diagram without departing from the scope of the disclosure. Similarly, each point on the pressure-enthalpy diagram may vary dynamically over time as variables within and external to the heat engine system 100 (FIG. 1A) change, e.g., ambient temperature, waste heat temperature, amount of mass (e.g., working fluid) in the system, or combinations thereof.

In one embodiment, the thermodynamic cycle is executed during normal, steady state operation such that the low pressure side of the heat engine system 100 (points A and D in the pressure-enthalpy diagram) falls between about 400 pounds per square inch absolute (psia) and about 1,500 psia, and the high pressure side of the heat engine system 100 (points B and C in the pressure-enthalpy diagram) falls between about 2,500 psia and about 4,500 psia. Those skilled in the art will also readily recognize that either or both higher or lower pressures could be selected for each or all points A-D. In at least one embodiment, the working fluid may transition from a supercritical state to a subcritical state (e.g., a transcritical cycle) between points C and D. In other embodiments, however, the pressures at points C and D may be selected or otherwise configured such that the working fluid remains in a supercritical state throughout the entire cycle. It should be noted that representative operative temperatures, pressures, and flow rates as indicated in any of the Figures or otherwise defined or described herein are by way of example only and are not in any way to be considered as limiting the scope of the disclosure.

Referring again to FIG. 1A, the use of carbon dioxide as the working fluid in thermodynamic cycles, such as in the heat engine system 100, requires particular attention to the inlet pressure of the pump 9 which has a direct influence on the overall efficiency of the heat engine system 100 and, therefore, the amount of power ultimately generated. Because of the thermo-physical properties of carbon dioxide, it is beneficial to control the inlet pressure of the pump 9 as the inlet temperature of the pump 9 rises. For example, one key thermo-physical property of carbon dioxide is its near-ambient critical temperature which requires the suction pressure of the pump 9 to be controlled both above and below the critical pressure (e.g., subcritical and supercritical operation) of the carbon dioxide. Further, keeping the inlet pressure at the pump 9 above saturation is of key importance to avoid cavitating the pump 9. Another key thermo-physical property of carbon dioxide to be considered is its relatively high compressibility and low overall pressure ratio, which makes the volumetric and overall efficiency of the pump 9 more sensitive to the suction pressure margin than would otherwise be achieved with other working fluids.

In order to minimize or otherwise regulate the suction pressure of the pump 9, the heat engine system 100 may incorporate the use of a mass management system ("MMS") 110. The MMS 110 may be configured to control the inlet pressure of the pump 9 by regulating the amount of working fluid entering and/or exiting the heat engine system 100 at strategic locations in the working fluid circuit, such as at tie-in points A, B, and C. Consequently, the heat engine system 100 becomes more efficient by manipulating the suction and discharge pressures for the pump 9, and thereby increasing the pressure ratio across the turbine 3 to its maximum possible extent.

It will be appreciated that any of the various embodiments of cycles and/or working fluid circuits described herein can be considered as closed-loop fluid circuits of defined volume, wherein the amount of mass can be selectively varied both within the cycle or circuit and within the discrete portions within the cycle or circuit (e.g., between the waste heat exchanger 5 and the turbine 3 or between the cooler 12 and the pump 9). In normal operation, the working fluid mass in the high pressure side of the cycle is essentially set by the fluid flow rate and heat input. The mass contained within the low pressure side of the cycle, on the other hand, is coupled to the low-side pressure, and a means is necessary to provide optimal control of both sides. Conventional Rankine cycles (both steam and organic) use other control methods, such a vapor-liquid equilibrium to control low side pressure. In the case of a system which must operate with low-side pressures that range above and below the critical pressure, this option is not possible. Thus, actively controlling the injection and withdrawal of mass from the closed-loop fluid circuit is necessary for the proper functioning and control of a practical supercritical carbon dioxide system. As described below, this can be accomplished through the use of the MMS 110 and variations of the same.

As illustrated, the MMS 110 may include a plurality of valves 14, 15, 16, 17, connection points 18, 21, 22, and 23, and a mass control tank 7. The valves and connection points 14, 15, 16, 17, 18, 21, 22, and 23 may be considered as termination points where the MMS 110 is operatively connected to the heat engine system 100, provided with additional working fluid from an external source, or provided with an outlet for flaring excess working fluid or pressures. Particularly, a first valve 14 (SOVMC1) may fluidly couple the MMS 110 to the heat engine system 100 at or near tie-in point A. At tie-in point A, the working fluid may be heated and pressurized after being discharged from the waste heat exchanger 5. A second valve 15 (SOVMC2) may fluidly couple the MMS 110 to the system at or near tie-in point C. Tie-in point C may be arranged adjacent the inlet to the pump 9 where the working fluid circulating through the heat engine system 100 is generally at a low temperature and pressure. It will be appreciated, however, that tie-in point C may be arranged anywhere on the low pressure side of the heat engine system 100, without departing from the scope of the disclosure.

The mass control tank 7 may be configured as a localized storage for additional working fluid that may be added to the fluid circuit when needed in order to regulate the pressure or temperature of the working fluid within the fluid circuit. The MMS 110 may pressurize the mass control tank 7 by opening the first valve 14 (SOVMC1) to allow high-temperature, high-pressure working fluid to flow to the mass control tank 7 from tie-in point A. The first valve 14 (SOVMC1) may remain in its open position until the pressure within the mass control tank 7 is sufficient to inject working fluid back into the fluid circuit via the second valve 15 (SOVMC2) and tie-in point C. In one embodiment, the second valve 15 (SOVMC2) may be fluidly coupled to the bottom of the mass control tank 7, whereby the densest working fluid from the mass control tank 7 is injected back into the fluid circuit at or near tie-in point C. Accordingly, adjusting the position of the second valve 15 (SOVMC2) may serve to regulate the inlet pressure of the pump 9.

A third valve 16 (SOVMC3) may fluidly couple the MMS 110 to the fluid circuit at or near tie-in point B. The working fluid at tie-in point B may be more dense and at a higher pressure relative to the density and pressure on the low pressure side of the heat engine system 100, for example adjacent tie-in point C. The third valve 16 (SOVMC3) may be opened to remove working fluid from the fluid circuit at tie-in point B and deliver the removed working fluid to the mass control tank 7. By controlling the operation of the valves 14, 15, 16, the MMS 110 adds and/or removes working fluid mass to/from the heat engine system 100 without the need of a pump, thereby reducing system cost, complexity, and maintenance.

The MMS 110 may also include a fourth valve 17 (SOVMC4) and a connection point 18, where fourth valve 17 (SOVMC4) may be used to vent working fluid from the MMS 110. The connection point 21 may be a location where additional working fluid may be added to the MMS 110 from an external source, such as a fluid fill system (not shown). Embodiments of an exemplary fluid fill system that may be fluidly coupled to the connection point 21 to provide additional working fluid to the MMS 110 are also described in U.S. application Ser. No. 12/880,428, filed Sep. 13, 2010, and issued as U.S. Pat. No. 8,281,593, which is incorporated herein by reference to the extent consistent with the present disclosure. The remaining connection points 22, 23 may be used in a variety of operating conditions such as start-up, charging, and shut-down of the waste heat recovery system. For example, point 22 may be a pressure relief valve.

The working fluid within the mass control tank 7 may be in liquid phase, vapor phase, or both. In other embodiments, the working fluid within the mass control tank 7 may be in a supercritical state. Where the working fluid is in both vapor and liquid phases, the working fluid will tend to stratify and a phase boundary may separate the two phases, whereby the more dense working fluid will tend to settle to the bottom of the mass control tank 7 and the less dense working fluid will advance toward the top of the mass control tank 7. Consequently, the second valve 15 (SOVMC2) will be able to deliver back to the fluid circuit the densest working fluid available in the mass control tank 7.

The MMS 110 may be configured to operate with the heat engine system 100 semi-passively. To accomplish this, the heat engine system 100 may further include first, second, and third sets of sensors 102, 104, and 106, respectively. As depicted, the first set of sensors 102 may be arranged at or adjacent the suction inlet of the pump 9, and the second set of sensors 104 may be arranged at or adjacent the outlet of the pump 9. The first and second sets of sensors 102, 104 monitor and report the working fluid pressure and temperature within the low and high pressure sides of the fluid circuit adjacent the pump 9. Accordingly, the first set of sensors 102 may measure the low-side pressure P1 of the working fluid at the inlet of the pump 9, and the second set of sensors 104 may measure the high-side pressure P2 at the outlet of pump 9. The third set of sensors 106 may be arranged either inside or adjacent the mass control tank 7 and be configured to measure and report the pressure and temperature of the working fluid within the mass control tank 7, with the pressure in the mass control tank 7 being referred to herein as the storage pressure $P_{MC}$. Additionally, the heat engine system 100 may include sensors (not shown) configured to measure the pressure in the working fluid between the waste heat exchanger 5 and the turbine 3, which is referred to herein as the system pressure $P_{42}$.

The heat engine system 100 may further include a control system (or "controller") 108 that is communicable (wired or wirelessly) with each sensor 102, 104, 106 in order to process the measured and reported temperatures, pressures, and mass flow rates of the working fluid at predetermined or designated points within the heat engine system 100. The control system 108 may also communicate with external sensors (not shown) or other devices that provide ambient or environmental conditions around the heat engine system 100.

In response to the reported temperatures, pressures, mass flow rates, and/or other variable conditions provided by the sensors 102, 104, 106, and also to ambient and/or environmental conditions, the control system 108 may be able to adjust the general disposition of each of the valves 14, 15, 16, 17. The control system 108 may be communicably coupled (wired or wirelessly) to each valve 14 (SOVMC1), 15, 16, 17 and configured to activate one or more actuators, servos, or other mechanical or hydraulic devices capable of opening or closing the valves 14, 15, 16, 17. Accordingly, the control system 108 may receive the measurement communications from each set of sensors 102, 104, 106 and selectively adjust (e.g., open, close, or disposed at a control point therebetween) each valve 14 (SOVMC1), 15, 16, 17 in order to maximize operation of the heat engine system 100. As will be appreciated, control of the various valves 14, 15, 16, 17 and related equipment may be automated or semi-automated.

As the term is used herein, "communicably coupled" is intended to mean that the controller 150 is able at least to send signals to the valves 14, 15, 16, 17. The valves 14, 15, 16, 17 are, in turn, configured to respond to the signals, typically to open or close. Such signals may include pneumatic, hydraulic, electronic, combinations thereof, or any other type of signals.

In one embodiment, the control system 108 may be in communication (via wires, RF signal, light, pneumatic or hydraulic lines, and other ways) with each of the sensors 102, 104, 106, and/or other sensors (not shown) in the heat engine system 100 and communicably coupled with and configured to control the operation of each of the valves (e.g., 14, 15, 16, 17) in accordance with a control software, algorithm, or other predetermined control mechanism, as will be described in greater detail below, with reference to FIG. 3. In some examples, the control system 108 may be utilized for actively controlling or otherwise adjusting the temperature and pressure of the working fluid at the inlet of the first pump 9, thereby selectively increasing the suction pressure of the first pump 9 by decreasing compressibility of the working fluid. Therefore, such adjustment of the temperature and pressure may avoid damage to the pump 9 as well as increase the overall pressure ratio of the thermodynamic cycle, which improves the efficiency and the power output of the heat engine system 100. Additionally, such adjustment of the temperature and pressure may raise the volumetric efficiency of the pump 9, thus allowing operation of the pump 9 at reduced speeds than otherwise provided without such configuration.

In one embodiment, the control system 108 may include one or more proportional-integral-derivative (PID) controllers as a control loop feedback system. In another embodiment, the control system 108 may be any microprocessor-based system capable of storing a control program and executing the control program to receive sensor inputs and generate control signals in accordance with a predetermined algorithm or table. For example, the control system 108 may be a microprocessor-based computer running a control software program stored on a computer-readable medium. The software program may be configured to receive sensor inputs from the various pressure sensors, temperature sensors, flow rate sensors, and/or other sensors (e.g., sensors 102, 104, and 106) positioned throughout the working fluid circuit and generate control signals therefrom, wherein the control signals are configured to optimize and/or selectively control the operation of the working fluid circuit.

One method of controlling the pressure of the working fluid in the low side of the heat engine system 100 is by controlling the temperature of the mass control tank 7 which feeds the low-pressure side via tie-in point C. Those skilled in the art will recognize that a desirable requirement is to maintain the suction pressure of the pump 9 above the boiling pressure of the working fluid. This can be accomplished by maintaining the temperature of the mass control tank 7 at a greater value than the temperature at the inlet of the pump 9.

Referring to FIGS. 1B-1D, illustrated are various configurations of the MMS 110 that may be adapted to control the pressure and/or temperature of the working fluid in the mass control tank 7, and thereby increase or decrease the suction pressure at the pump 9. Numerals and tie-in points shown in FIGS. 1B-1D correspond to like components described in FIG. 1A and therefore will not be described again in detail. Temperature control of the mass control tank 7 may be accomplished by either direct or indirect heat, such as by the use of a coil 114, which may be a heat exchanger coil, e.g., in embodiments where the coil 114 serves as a heater and a cooler, or an external heater (electrical or otherwise). As such, the coil 114 may be referred to herein as a heat exchanger coil 114 or a heater 114. In some embodiments, the illustrated coil 114 may be representative of both a heat exchanger coil and a heater 114. Furthermore, the heater 114 is not limited to any particular structural embodiment and need not be disposed in a coil configuration. The control system 108 (FIG. 1A) may be further communicably coupled to the heat exchanger coil 114 and configured to selectively engage, cease, or otherwise regulate its operation.

In FIG. 1B, the heat exchanger coil 114 may be arranged without the mass control tank 7 and provide thermal energy via convection. In other embodiments, the coil 114 may be wrapped around the mass control tank 7 and thereby provide thermal energy via conduction. Depending on the application, the coil 114 may be a refrigeration coil adapted to cool the mass control tank 7 or a heater coil adapted to heat the mass control tank 7. In other embodiments, the coil 114 may serve as both a refrigerator and heater, depending on the thermal fluid circulating therein and thereby being able to selectively alter the temperature of the mass control tank 7 according to the requirements of the heat engine system 100.

As illustrated, the mass control tank 7 may be fluidly coupled to the working fluid circuit at tie-in point C. Via tie-in point C, working fluid may be added to or extracted from the working fluid circuit, depending on the temperature of the working fluid within the mass control tank 7. For example, heating the working fluid in the mass control tank 7 will pressurize the tank and tend to force working fluid into the working fluid circuit from the mass control tank 7, thereby effectively raising the suction pressure of the pump 9. Conversely, cooling the working fluid in the mass control tank 7 will tend to withdraw working fluid from the working fluid circuit at tie-in point C and inject that working fluid into the mass control tank 7, thereby reducing the suction pressure of the pump 9. Accordingly, working fluid mass moves either in or out of the mass control tank 7 via tie-in point C depending on the average density of the working fluid therein.

FIG. 1C illustrates that the coil 114 may be disposed within the mass control tank 7 in order to directly heat or cool the working fluid in the mass control tank 7. In this embodiment, the coil 114 may be fluidly coupled to the cooler 12 and use a portion of the thermal fluid 116 circulating in the cooler 12 to heat or cool the mass control tank 7. In one embodiment, the thermal fluid 116 in the cooler 12 may be water. In other embodiments, the thermal fluid may be a type of glycol and water, or any other thermal fluid known in the art. In yet other embodiments, the thermal fluid may be a portion of the working fluid tapped from the heat engine system 100.

FIG. 1D illustrates that the coil 114 may be disposed within the mass control tank 7, and may be fluidly coupled to the discharge of the pump 9 via tie-in point B. Therefore, the coil 114 may be adapted to circulate working fluid that is extracted from the working fluid circuit at tie-in point B in order to heat or cool the working fluid in the mass control tank 7, depending on the discharge temperature of the pump 9. After passing through the coil 114, the extracted working fluid may be injected back into the working fluid circuit at point 118, which may be arranged downstream from the recuperator 6. A valve 120 may be arranged in the conduit leading to point 118 for restriction or regulation of the working fluid as it re-enters the working fluid circuit.

Depending on the temperature of the working fluid extracted at tie-in point B and the amount of cooling and/or heating realized by the coil 114 in the mass control tank 7, the mass control tank 7 may be adapted to either inject fluid into the working fluid circuit at tie-in point C or extract working fluid at tie-in point C. Consequently, the suction pressure of the pump 9 may be selectively managed to increase the efficiency of the heat engine system 100.

Figure 3:
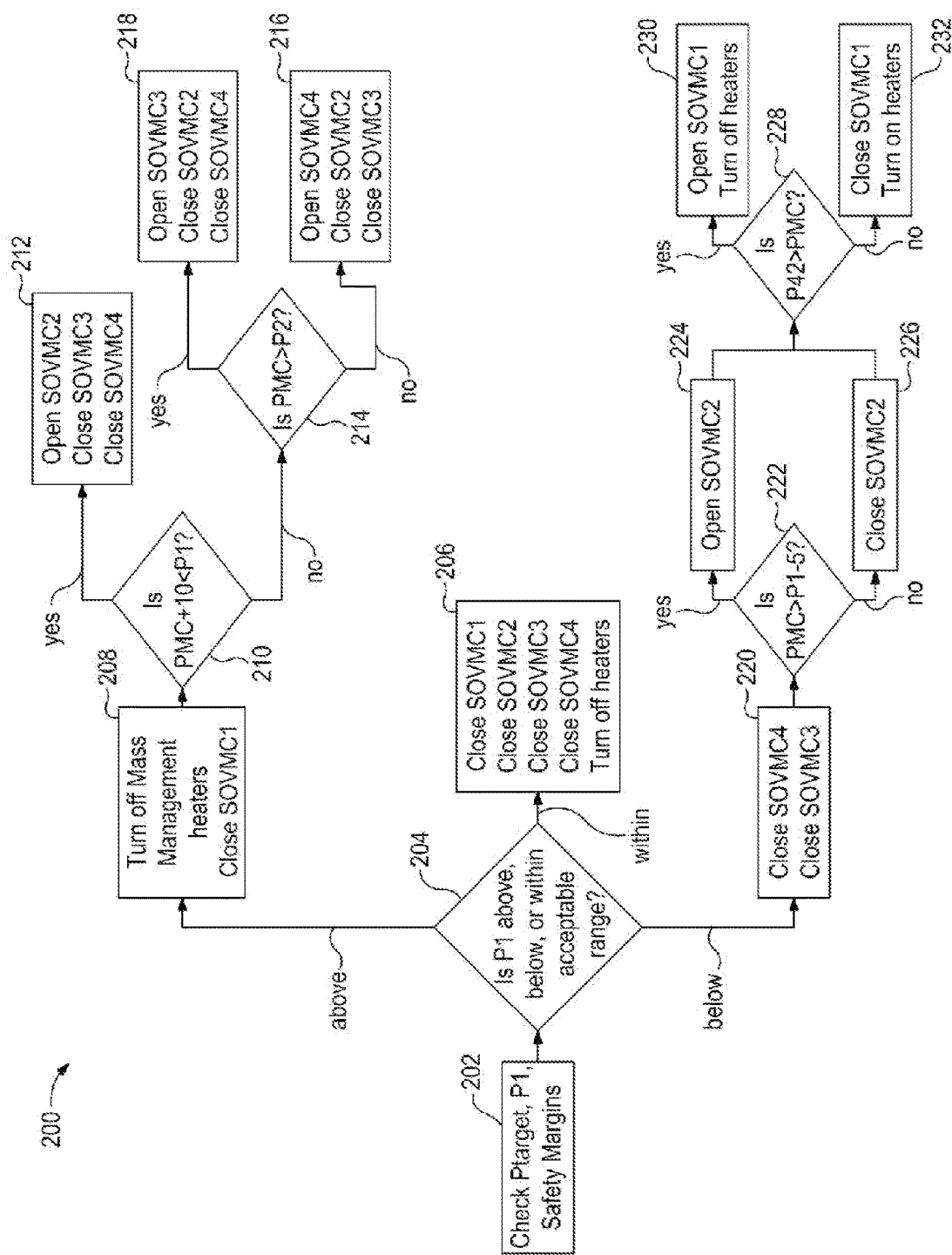
FIG. 3 is a flowchart of a control scheme for the mass management system, according to an embodiment.

With additional reference to FIG. 1A, FIG. 3 illustrates a flowchart of a control scheme 200 for controlling the MMS 110, which may also be described as a method for controlling pressure in the heat engine system 100, according to an embodiment. The control scheme 200 may be at least partially implemented by the controller 108. Further, the control scheme 200 may be iterative, repeating itself continually until system shutdown, emergency or upset conditions, operator override, or any other reason. The control scheme 200 may operate by modulation of one or more of the first, second, third, and fourth valves 14, 15, 16, 17, which may be known, for example, as SOVMC1, SOVMC2, SOVMC3, and SOVMC4, respectively. Each valve 14-17 may be configured for automatic, electronically-signaled modulation. In other embodiments, one, some, or each of the valves 14-17 may be configured for manual modulation by an operator in addition to or in lieu of such automatic modulation. In the later instance, the controller 108 may provide a display, instructing the operator to manipulate the position of one or more of the valves 14-17. It will be appreciated that the valves 14-17 may include any one or more type of valves consistent with the present disclosure.

The control scheme 200, at the beginning of each iteration or at start-up, begins by receiving system inputs at 202. The system inputs include a target pressure $P_{Target}$, e.g., a desired pressure level for the working fluid at the inlet of pump 9. The target pressure $P_{Target}$ may be calculated automatically, for example, using a temperature reading from the sensor 102, or a sensor at another location upstream from or proximal to the inlet of pump 9, and deriving a desired pressure using this temperature and known thermodynamic properties of the working fluid. For example, the target pressure $P_{Target}$ may be set to a point that is above saturation pressure, such that the working fluid does not cavitate when at or near the target pressure $P_{Target}$. However, the target pressure $P_{Target}$ is also generally set sufficiently low so as to safely maximize system pressure ratio. Additionally or instead of such automatic target pressure $P_{Target}$ calculation, the control scheme 200 may receive the target pressure $P_{Target}$ directly from an operator, for example, through a user interface.

Receiving the system inputs at 202 also includes measuring or "sensing" the low-side pressure P1 of the working fluid at the inlet of pump 9, for example, using the sensor 102 or another sensor. Further, the control scheme 200 may set safety margins acceptable for the application. In another embodiment, the safety margins may be entered by an operator through a user interface. For example, one safety margin may provide the desired minimum difference between saturation and the target pressure $P_{Target}$ and/or low-side pressure P1, to ensure cavitation does not occur. Another safety margin may limit the extent to which the low-side pressure P1 may exceed the target pressure $P_{Target}$. It will be appreciated that the safety margin above the target pressure $P_{Target}$ may be less than, equal to, or greater than the safety margin below the target pressure. For example, since constraining the lower bound of the low-side pressure P1 is generally more important to safety, this safety margin may be less than the safety margin above the target pressure $P_{Target}$.

Once the inputs are set, the control scheme 200 proceeds to comparing the low-side pressure P1 with the target pressure $P_{Target}$, as at 204. Comparing at 204 may include determining whether the low-side pressure P1 is within an acceptable range of the target pressure $P_{Target}$, e.g., the target pressure $P_{Target}$ plus and/or minus the appropriate safety margin determined at 202. Comparing at 204 has three possible results: the low-side pressure P1 is within the acceptable range ($P_{Target}$−Safety Margin≤P1≤$P_{Target}$+Safety Margin), the low-side pressure P1 is too high (P1>$P_{Target}$+Safety Margin), or the low-side pressure P1 is too low (P1<$P_{Target}$−Safety Margin).

If the low-side pressure P1 is within the acceptable range, the control scheme 200 proceeds to put the MMS 110 on standby, as at 206. In standby, the MMS 110 is not required to provide, relieve, or offload pressure at the inlet of pump 9. As such, the four valves 14-17 (SOVMC1-4) are closed (or, if already closed, not opened) and the heater 114 in the MMS 110 is powered down, thereby "isolating" the mass control tank 7 from the pump 9, the waste heat exchanger 5, and the offload terminal 23. As the term is used herein, "isolating" one component from another is generally defined to mean fluid communication is at least substantially cut off, for example, by closing a valve. If the control scheme 200 calls for "isolating" and the appropriate valves are already closed, then isolating may not require any additional action. Immediately, after a time delay, or upon an interrupt, upset, or alarm, the control scheme 200 may cycle back to receiving inputs at 202, thereby starting the next iteration.

Referring again to comparing at 204, if the low-side pressure P1 is too high (e.g., P1 is "above" range, as indicated), the control scheme 200 proceeds to decreasing the pressure in the MMS 110, at 208. Such pressure-lowing corrective action includes powering down the heater 114 and closing first valve 14 (SOVMC1). Closing the first valve 14 (SOVMC1) avoids referencing the pressure in the mass control tank 7 to the high pressure working fluid downstream from the waste heat exchanger 5, which may be unnecessary as the MMS 110 seeks to reduce the low-side pressure P1.

Immediately or after a time delay to allow the pressure in the mass control tank 7 to drop, the control scheme 200 compares the storage pressure $P_{MC}$ of the working fluid contained in the mass control tank 7 to the low-side pressure P1, as at 210, to determine if referencing the inlet of pump 9 to the mass control tank 7 will have the desired effect of lowering the pressure at the inlet of pump 9. However, the sensors (e.g., sensor 102, 104) have an inherent level of uncertainty, such that it may be undesirable to directly compare the two pressures $P_{MC}$ and P1. Accordingly, a margin of pressure may be used to reliably ensure that $P_{MC}$ is actually lower than P1. In some examples, the margin of pressure may be about 10 pounds per square inch absolute (psia). In other examples, the margin of pressure may be about 20 psia or less, such as about 15 psia or less, about 8 psia or less, about 6 psia or less, about 5 psia or less, about 1 psia or less. The amount of the margin may be a system input from the operator, or may be set prior to system deployment according to the application and the expected operating parameters and the precision of the sensors employed. As the term is used herein, when comparing two pressure measurements, the two are "about equal" if one is equal to the other or one is within a range set by one or more tolerances (e.g., the aforementioned margins) of the other.

If the storage pressure $P_{MC}$ is sufficiently lower than the actual pressure P1, the control scheme 200 proceeds to modulating valves at 212 to reduce pressure at the inlet of pump 9. Modulating the valves at 212 may include opening the second valve 15 (SOVMC2), closing the third valve 16 (SOVMC3), and closing the fourth valve 17 (SOVMC4). Since the first valve 14 (SOVMC1) was closed at 208, the position of all four valves 14-17 is thus set. Opening the third valve 16 (SOVMC3) directs a portion of the working fluid exiting the pump 9 to the mass control tank 7. Closing the second valve 15 (SOVMC2) prevents reintroduction of the working fluid from the mass control tank 7 to the inlet of pump 9, and closure of the fourth valve 17 (SOVMC4) prevents off-loading of the working fluid. Accordingly, at least a portion of the fluid pumped by the pump 9 is routed out of the process flowpath and into the mass control tank 7, thereby decreasing pressure in the system and, thus, to the inlet of pump 9.

On the other hand, if, after decreasing the pressure in the storage tank at 208, the storage pressure $P_{MC}$ is still not sufficiently lower than the low-side pressure P1, as determined at 210, the control scheme 200 checks if working fluid needs to be vented from the heat engine system 100, or whether such waste can be avoided. Accordingly, the control scheme 200 determines whether the storage pressure $P_{MC}$ exceeds the high-side pressure P2 at the pump 9 discharge, as at 214. If the storage pressure is lower than the high-side pressure P2, the control scheme 200 proceeds to venting or "offloading" working fluid from the mass control tank 7, as at 216. Offloading at 216 includes opening the fourth valve 17 (SOVMC4) and closing the remaining second and third valves 15, 16. Accordingly, at least a portion of the working fluid in the mass control tank 7 is offloaded to connection point (or "offload terminal") 23 to, for example, a blowdown tank (not shown) or directly to the environment, via the open fourth valve 17 (SOVMC4). The working fluid is prevented from introduction back into the heat engine system 100 by the closed first-third valves 14-16.

If the determination at 214 indicates that the storage pressure $P_{MC}$ is less than the high-side pressure P2, instead of offloading the working fluid, the control scheme 200 references the pressure in the mass control tank 7 to the high-side pressure P2, as at 218. This is accomplished at 218 by opening the third valve 16 (SOVMC3), and closing the second and fourth valves 15, 17, thereby providing pressure communication between the outlet of pump 9 and the mass control tank 7. Therefore, pressure in the mass control tank 7 is reduced to the high-side pressure P2. On the next iteration of the control scheme 200, the comparison between the storage pressure $P_{MC}$ and the high-side pressure P2 may be reversed, such that offloading occurs (described above), as at 216; however, including the option of equalizing the high-side pressure P2 and the storage pressure $P_{MC}$, as at 218, may result in less total offloading as the pressure is partially reduced by referencing the storage pressure $P_{MC}$ to the high-side pressure P2.

Referring once again to the first determination of the illustrated embodiment, as at 204, if the low-side pressure P1 is too low, corrective action is generally required to avoid undesired conditions, such as cavitation, which can be harmful to the pump 9. Since the pressure is too low, the mass control tank 7 provides additional pressure to the inlet of pump 9; accordingly, there may be no need to independently lower the pressure in the mass control tank 7. Therefore, the third and fourth valves 16, 17 may be closed without further determinations, as at 220, since the third and fourth valves 16, 17 are opened (e.g., at 216 and 218) to reduce storage pressure $P_{MC}$.

The control scheme 200 then proceeds to determining whether the storage pressure $P_{MC}$ is greater than the low-side pressure P1, as at 222, such that the mass control tank 7 will be effective in increasing the low-side pressure P1. Again, a margin of pressure is employed to account for a limited precision of the sensors employed in the heat engine system 100. In some examples, the margin of pressure may be about 5 psia. In other examples, the margin of pressure may be within a range from about 1 psia to about 15 psia, more narrowly within a range from about 2 psia to about 10 psia, more narrowly within a range from about 3 psia to about 7 psia, and more narrowly within a range from about 4 psia to about 6 psia. The margin of pressure may have a lower value than the margin of pressure employed at 210, as the measured values of the total pressure may be less.

If the storage pressure $P_{MC}$ is greater than the low-side pressure P1 (plus any applicable margin), then the second valve 15 (SOVMC2) may be opened, as at 224. This allows the higher pressure working fluid in the mass control tank 7 to flow to the inlet of pump 9, increasing the low-side pressure P1 at pump 9 inlet. After such equalization and/or if the storage pressure $P_{MC}$ is not sufficiently higher than the low-side pressure, the second valve 15 (SOVMC2) is closed, as at 226.

Either while the second valve 15 (SOVMC2) is opened, or after the second valve 15 (SOVMC2) is closed, the control scheme 200 compares the highest pressure P42 in the system, generally taken between the waste heat exchanger 5 and the turbine 3, and the storage pressure $P_{MC}$, as at 228. If the storage pressure $P_{MC}$ is lower than the highest pressure $P_{42}$, the first valve 14 (SOVMC1) is opened to refill and pressurize the mass control tank 7, as at 230. In an exemplary embodiment, as the high-temperature, high-pressure working fluid fills the mass control tank 7 via the open first valve 14 (SOVMC1), the heater 114 in the MMS 110 may be powered down or turned off. If the storage pressure $P_{MC}$ is greater than or equal to the highest pressure $P_{42}$, then the first valve 14 (SOVMC1) is closed, as at 232, as no additional working fluid may be required to fill the mass control tank 7. To maintain pressure and desired phase states of the working fluid, the heater 114 may be also be turned on.

Accordingly, the control scheme 200 is configured to handle and correct, if necessary, each possible outcome of the determination at 204, comparing the low-side pressure P1 to the target pressure $P_{Target}$. As indicated above, the control scheme 200 is iterative, such that the determination at 204 is carried out many times.

At the onset of each iteration, the first-fourth valves 14-17 may be some combination of open and/or closed, according to the results of the previous iteration. For example, at 216, the first, second, and third valves 14-16 are closed, while the fourth valve 17 (SOVMC4) is open. In the next iteration, the low-side pressure P1 may be in acceptable range at 204 and, as such, the control scheme 200 sets the MMS 110 to standby, closing all four valves 14-17. The first, second, and third valves 14-16 are already closed, however. As such, the controls scheme 200 calls for "closing" an already closed valve. In such case, closing may include checking to ensure the valve is closed, signaling the valve to close, whereby no movement in the valve occurs, opening and then closing the valve in sequence, a combination thereof, or doing nothing. Similarly, "opening" an already open valve includes checking to ensure the valve is open, signaling the valve to open, whereby no movement in the valve occurs, closing and then opening the valve in sequence, a combination thereof, or doing nothing.

Figure 7:
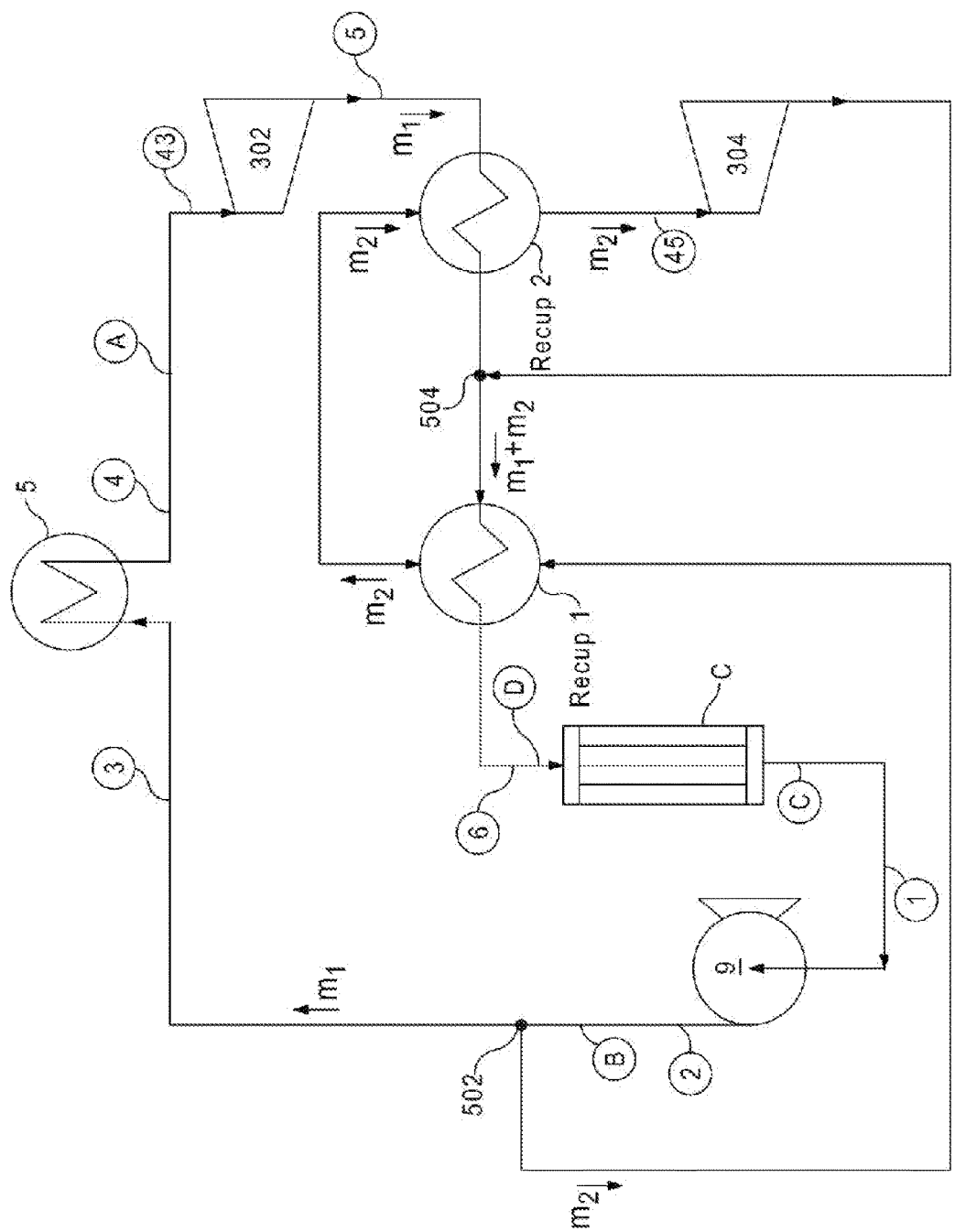
Figure 8:
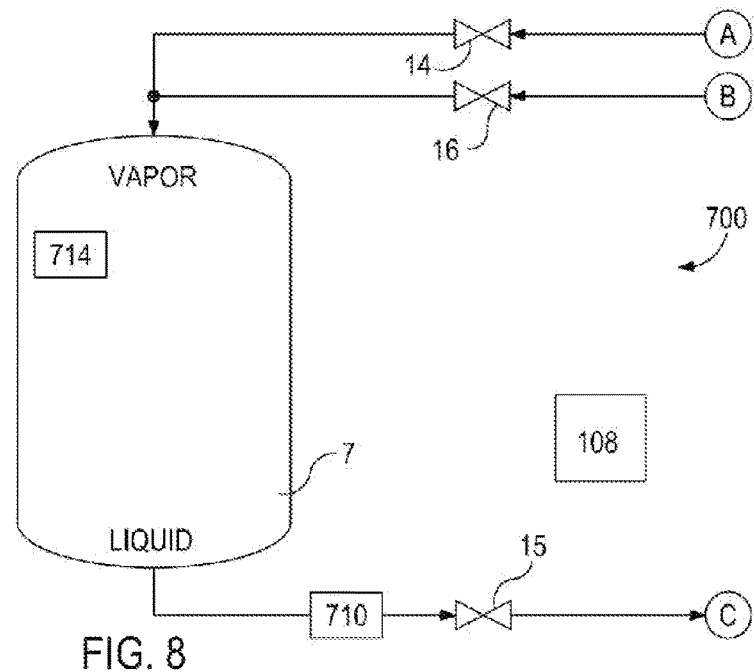
FIG. 8 schematically illustrates an embodiment of a mass management system which can be implemented with heat engine cycles, according to one or more embodiments disclosed.

Referring now to FIGS. 7 and 8, illustrated are other exemplary mass management systems 700 and 800, respectively, which may be used in conjunction with the heat engine system 100 of FIG. 1A to regulate the amount of working fluid in the fluid circuit. In one or more embodiments, the MMS 700, 800 may be similar in several respects to the MMS 110 described above and may, in one or more embodiments, entirely replace the MMS 110 without departing from the scope of the disclosure. For example, the system tie-in points A, B, and C, as indicated in FIGS. 7 and 8 (points A and C only shown in FIG. 9), correspond to the system tie-in points A, B, and C shown in FIG. 1A. Accordingly, each MMS 700, 800 may be best understood with reference to FIGS. 1A-1D, wherein like numerals represent like elements that will not be described again in detail.

The exemplary MMS 700 may be configured to store working fluid in the mass control tank 7 at or near ambient temperature. In exemplary operation, the mass control tank 7 may be pressurized by tapping working fluid from the working fluid circuit via the first valve 14 (SOVMC1) fluidly coupled to tie-in point A. The third valve 16 (SOVMC3) may be opened to permit relatively cooler, pressurized working fluid to enter the mass control tank 7 via tie-in point B. As briefly described above, extracting additional fluid from the working fluid circuit may decrease the inlet or suction pressure of the pump 9 (FIGS. 1A-1D).

When required, working fluid may be returned to the working fluid circuit by opening the second valve 15 (SOVMC2) fluidly coupled to the bottom of the mass control tank 7 and allowing the additional working fluid to flow through the third tie-in point C and into the working fluid circuit upstream from the pump 9 (FIGS. 1A-1D). In at least one embodiment, the MMS 700 may further include a transfer pump 710 configured to draw working fluid from the mass control tank 7 and inject it into the working fluid circuit via tie-in point C. Adding working fluid back to the circuit at tie-in point C increases the suction pressure of the pump 9.

Figure 9:
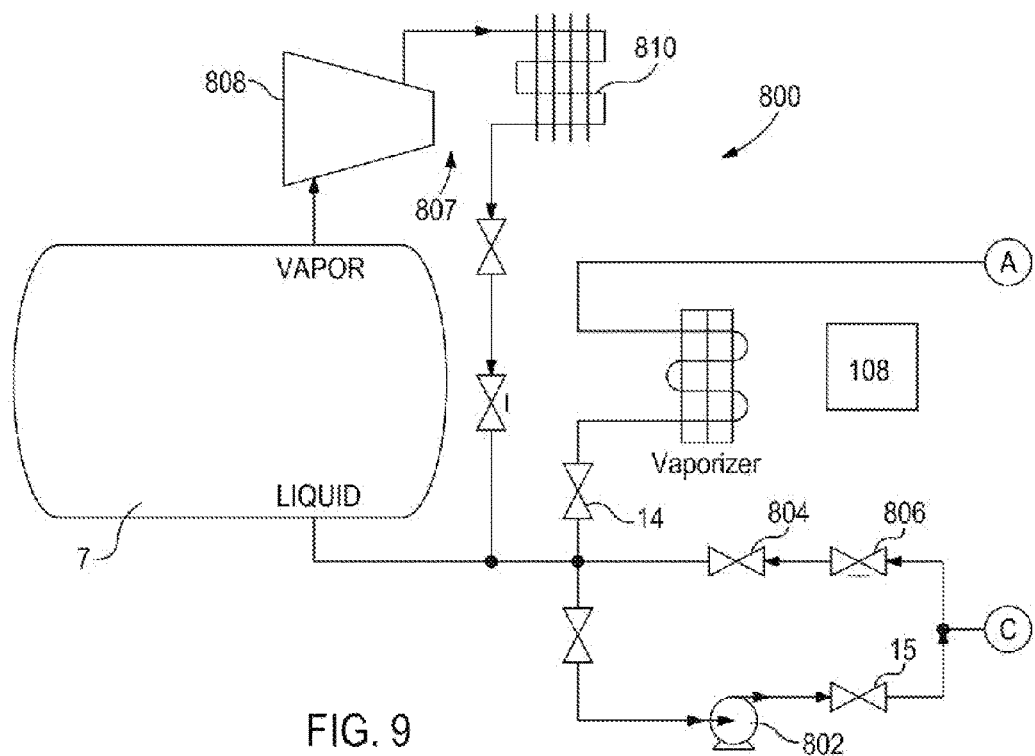
FIG. 9 schematically illustrates another embodiment of a mass management system that can be implemented with heat engine cycles, according to one or more embodiments disclosed.

The MMS 800 in FIG. 9 may be configured to store working fluid at relatively low temperatures (e.g., sub-ambient) and therefore exhibiting low pressures. As shown, the MMS 800 may include only two system tie-ins or interface points A and C. Tie-in point A may be used to pre-pressurize the working fluid circuit with vapor so that the temperature of the circuit remains above a minimum threshold during fill. As shown, the tie-in A may be controlled using the first valve 14 (SOVMC1). The valve-controlled interface A, however, may not generally be used during the control phase, powered by the control logic defined above for moving mass into and out of the system. The vaporizer prevents the injection of liquid working fluid into the heat engine system 100 which would boil and potentially refrigerate or cool the heat engine system 100 below allowable material temperatures. Instead, the vaporizer facilitates the injection of vapor working fluid into the heat engine system 100.

In operation, when it is desired to increase the suction pressure of the pump 9 (FIGS. 1A-1D), the second valve 15 (SOVMC2) may be opened and working fluid may be selectively added to the working fluid circuit via tie-in point C. In one embodiment, the working fluid is added with the help of a transfer pump 802. When it is desired to reduce the suction pressure of the pump 9, working fluid may be selectively extracted from the system also via tie-in point C, or one of several other ports (not shown) on the mass control tank 7, and subsequently expanded through one or more valves 804 and 806. The valves 804, 806 may be configured to reduce the pressure of the working fluid derived from tie-in point C to the relatively low storage pressure of the mass control tank 7.

Under most conditions, the expanded fluid following the valves 804, 806 will be two-phase fluid (e.g., vapor+liquid). To prevent the pressure in the mass control tank 7 from exceeding its normal operating limits, a small vapor compression refrigeration cycle 807 including a vapor compressor 808 and accompanying condenser 810 may be used. The refrigeration cycle 807 may be configured to decrease the temperature of the working fluid and condense the vapor in order to maintain the pressure of the mass control tank 7 at its design condition. In one embodiment, the vapor compression refrigeration cycle 807 forms an integral part of the MMS 800, as illustrated. In other embodiments, however, the vapor compression refrigeration cycle 807 may be a stand-alone vapor compression cycle with an independent refrigerant loop.

The control system 108 shown in each of the MMS 700, 800 may be configured to monitor and/or control the conditions of the working fluid and surrounding cycle environment, including temperature, pressure, flow rate and flow direction. The various components of each MMS 700, 800 may be communicably coupled to the control system 108 (wired or wirelessly) such that control of the various valves 14, 15, 16, 17 (SOVMC1-4) and other components described herein is automated or semi-automated in response to system performance data obtained via the various sensors (e.g., 102, 104, 106 in FIG. 1A).

In one or more embodiments, it may prove advantageous to maintain the suction pressure of the pump 9 above the boiling pressure of the working fluid. The pressure of the working fluid in the low side of the working fluid circuit can be controlled by regulating the temperature of the working fluid in the mass control tank 7, such that the temperature of the working fluid in the mass control tank 7 is maintained at a greater value than the temperature at the inlet of the pump 9. To accomplish this, the MMS 700 may include a heater and/or a coil 714 arranged within or about the mass control tank 7 to provide direct electric heat. The coil 714 may be similar in some respects to the coil 114 described above with reference to FIGS. 1B-1D. Accordingly, the coil 714 may be configured to add or remove heat from the fluid/vapor within the mass control tank 7.

The exemplary mass management systems 110, 700, 800 described above may be applicable to different variations or embodiments of thermodynamic cycles having different variations or embodiments of working fluid circuits. Accordingly, the thermodynamic cycle shown in and described with reference to FIG. 1A may be replaced with other thermodynamic, power-generating cycles that may also be regulated or otherwise managed using any one of the MMS 110, 700, or 800. For example, illustrated in FIGS. 4-7 are various embodiments of cascade-type thermodynamic, power-generating cycles that may accommodate any one of the MMS 110, 700, or 800 to fluidly communicate therewith via the system tie-ins points A, B, and C, and thereby increase system performance of the respective working fluid circuits. Reference numbers shown in FIGS. 4-7 that are similar to those referred to in FIGS. 1A-1D, 7, and 8 correspond to similar components that will not be described again in detail.

Figure 4:
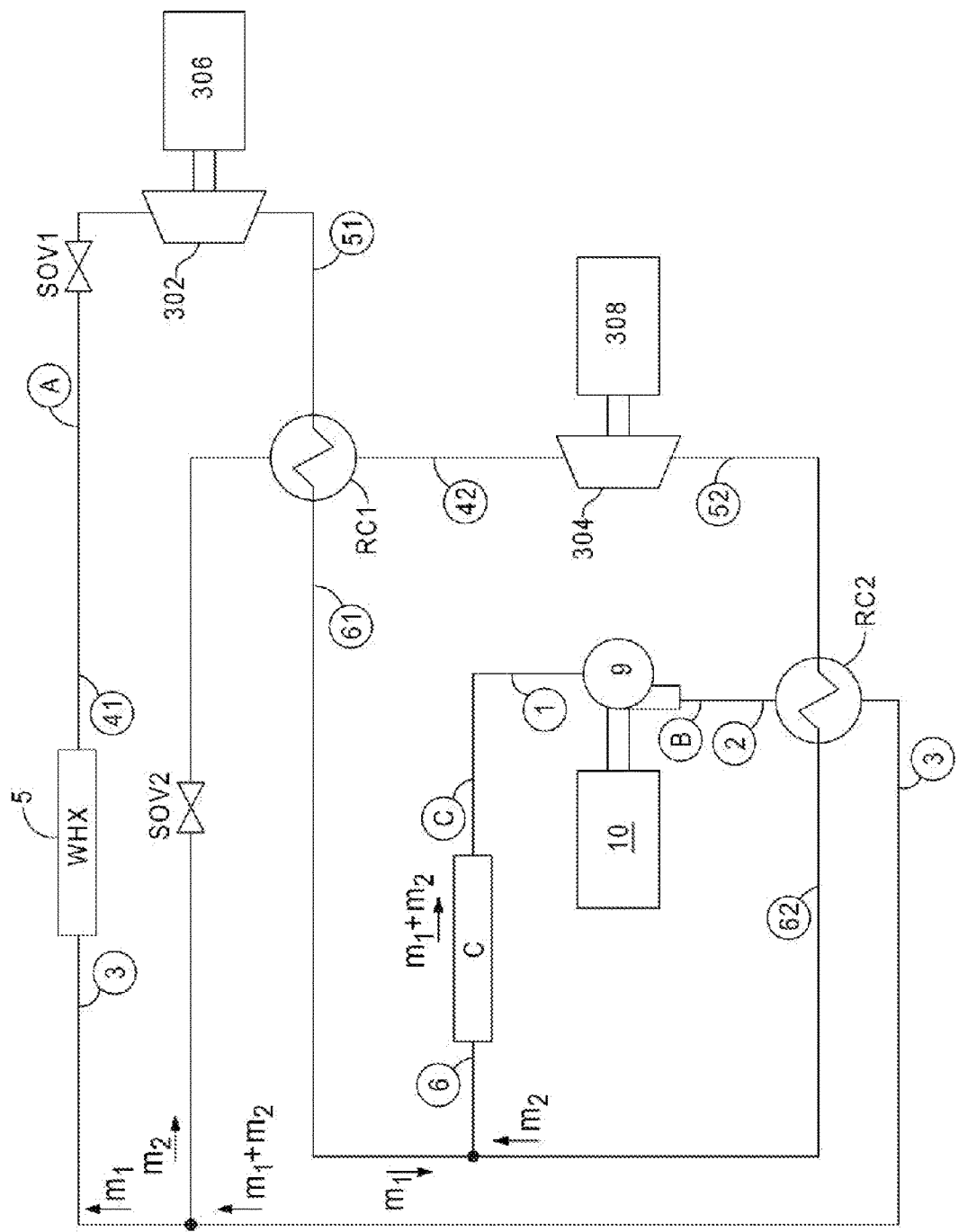
FIGS. 4-7 are schematic embodiments of various thermodynamic waste heat recovery cycles that the mass management system may supplement, according to one or more embodiments disclosed.

FIG. 4 schematically illustrates an exemplary "cascade" thermodynamic cycle in which the residual thermal energy of a first portion of the working fluid $m_1$ following expansion in a first power turbine 302 (e.g., adjacent state 51) is used to preheat a second portion of the working fluid $m_2$ before being expanded through a second power turbine 304 (e.g., adjacent state 52). More specifically, the first portion of working fluid $m_1$ is discharged from the first turbine 302 and subsequently cooled at a recuperator RC1. The recuperator RC1 may provide additional thermal energy for the second portion of the working fluid $m_2$ before the second portion of the working fluid $m_2$ is expanded in the second turbine 304.

Following expansion in the second turbine 304, the second portion of the working fluid $m_2$ may be cooled in a second recuperator RC2 which also serves to pre-heat a combined working fluid flow $m_1+m_2$ after it is discharged from the pump 9. The combined working fluid $m_1+m_2$ may be formed by merging the working fluid portions $m_1$ and $m_2$ discharged from both recuperators RC1, RC2, respectively. The condenser C may be configured to receive the combined working fluid $m_1+m_2$ and reduce its temperature prior to being pumped through the fluid circuit again with the pump 9. Depending upon the achievable temperature at the suction inlet of the pump 9, and based on the available cooling supply temperature and condenser C performance, the suction pressure at the pump 9 may be either subcritical or supercritical. Moreover, any one of the MMS 110, 700, or 800 described herein may fluidly communicate with the thermodynamic cycle shown in FIG. 4 via the system tie-in points A, B, and/or C, to thereby regulate or otherwise increase system performance as generally described above.

The first power turbine 302 may be coupled to and provide mechanical rotation to a first work-producing device 306, and the second power turbine may be adapted to drive a second work-producing device 308. In one embodiment, the work-producing devices 306, 308 may be electrical generators, either coupled by a gearbox or directly driving corresponding high-speed alternators. It is also contemplated herein to connect the output of the second power turbine 304 with the second work-producing device 308, or another generator that is driven by the first turbine 302. In other embodiments, the first and second power turbines 302, 304 may be integrated into a single piece of turbo-machinery, such as a multiple-stage turbine using separate blades/disks on a common shaft, or as separate stages of a radial turbine driving a bull gear using separate pinions for each radial turbine.

By using multiple turbines 302, 304 at similar pressure ratios, a larger fraction of the available heat source from the waste heat exchanger 5 is utilized and residual heat from the turbines 302, 304 is recuperated via the cascaded recuperators RC1, RC2. Consequently, additional heat is extracted from the waste heat source through multiple temperature expansions. In one embodiment, the recuperators RC1, RC2 may be similar to the waste heat exchanger 5 and include or employ one or more printed circuit heat exchange panels. Also, the condenser C may be substantially similar to the cooler 12 shown and described above with reference to FIG. 1A.

In any of the cascade embodiments disclosed herein, the arrangement or general disposition of the recuperators RC1, RC2 can be optimized in conjunction with the waste heat exchanger 5 to maximize power output of the multiple temperature expansion stages. Also, both sides of each recuperator RC1, RC2 can be balanced, for example, by matching heat capacity rates and selectively merging the various flows in the working fluid circuits through waste heat exchangers and recuperators; $C=m \cdot c_p$, where C is the heat capacity rate, m is the mass flow rate of the working fluid, and $c_p$ is the constant pressure specific heat. As appreciated by those skilled in the art, balancing each side of the recuperators RC1, RC2 provides a higher overall cycle performance by improving the effectiveness of the recuperators RC1, RC2 for a given available heat exchange surface area.

Figure 5:
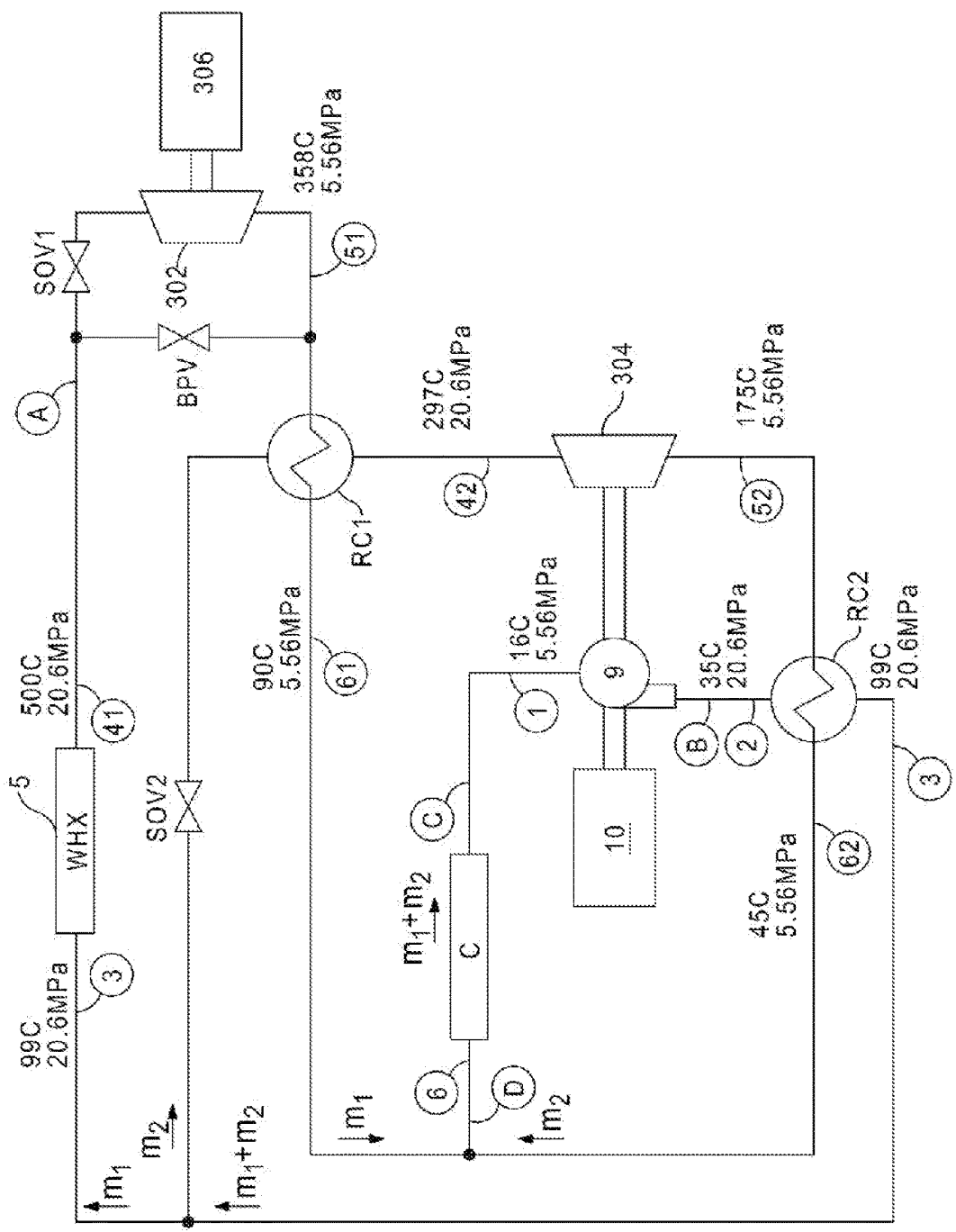

FIG. 5 is similar to FIG. 4, but with one key exception in that the second power turbine 304 may be coupled to the pump 9 either directly or through a gearbox. The motor 10 that drives the pump 9 may still be used to provide power during system start-up, and may provide a fraction of the drive load for the pump 9 under some conditions. In other embodiments, however, it is possible to utilize the motor 10 as a generator, particularly if the second power turbine 304 is able to produce more power than the pump 9 requires for system operation. Likewise, any one of the MMS 110, 700, or 800 may fluidly communicate with the thermodynamic cycle shown in FIG. 5 via the system tie-in points A, B, and C, and thereby regulate or otherwise increase the system performance.

Figure 6:
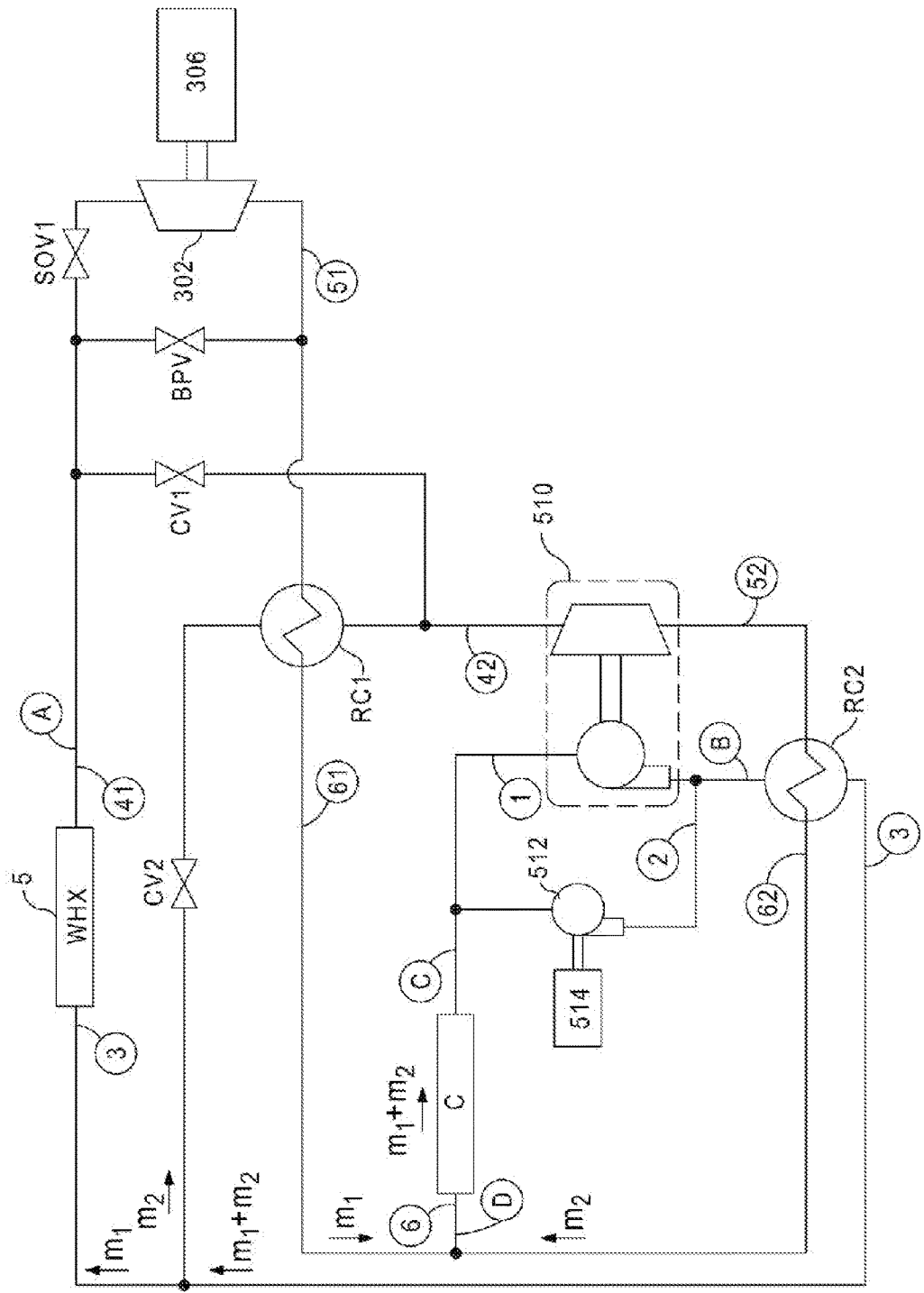

FIG. 6 is a variation of the system described in FIG. 5, whereby the motor-driven pump 9 is replaced by or operatively connected to a high-speed, direct-drive turbopump 510. As illustrated, a small "starter pump" 512 or other auxiliary pumping device may be used during system start-up, but once the turbopump 510 generates sufficient power to "bootstrap" itself into steady-state operation, the starter pump 512 can be shut down. The starter pump 512 may be driven by a separate motor 514 or other auxiliary driver known in the art.

Additional control valves CV1 and CV2 may be included to facilitate operation of the turbopump 510 under varying load conditions. The control valves CV1, CV2 may also be used to channel thermal energy into the turbopump 510 before the first power turbine 302 is able to operate at steady-state. For example, at system start-up the shut off valve SOV1 may be closed and the first control valve CV1 opened such that the heated working fluid discharged from the waste heat exchanger 5 may be directed to the turbopump 510 in order to drive the main system pump 9 until achieving steady-state operation. Once at steady-state operation, the control valve CV1 may be closed and the shut off valve SOV1 may be simultaneously opened in order to direct heated working fluid from the waste heat exchanger 5 to the power turbine 302.

As with FIGS. 3 and 4, any one of the MMS 110, 700, or 800 may be able to fluidly communicate with the thermodynamic cycle shown in FIG. 6 via the system tie-in points A, B, and C, and thereby regulate or otherwise increase the system performance.

FIG. 7 schematically illustrates another exemplary cascade thermodynamic cycle that may be supplemented or otherwise regulated by the implementation of any one of the MMS 110, 700, or 800 described herein. Specifically, FIG. 7 depicts a dual cascade heat engine cycle. Following the pump 9, the working fluid may be separated at point 502 into a first portion $m_1$ and a second portion $m_2$. The first portion $m_1$ may be directed to the waste heat exchanger 5 and subsequently expanded in the first stage power turbine 302. Residual thermal energy in the exhausted first portion $m_1$ following the first stage power turbine 302 (e.g., at state 5) may be used to preheat the second portion $m_2$ in a second recuperator (Recup2) prior to being expanded in a second-stage power turbine 304.

In one embodiment, the second recuperator Recup2 may be configured to preheat the second portion $m_2$ to a temperature within approximately 5 to 10° C. of the exhausted first portion $m_1$ fluid at state 5. After expansion in the second-stage power turbine 304, the second portion $m_2$ may be re-combined with the first portion $m_1$ at point 504. The re-combined working fluid $m_1+m_2$ may then transfer initial thermal energy to the second portion $m_2$ via a first recuperator Recup1 prior to the second portion $m_2$ passing through the second recuperator Recup2, as described above. The combined working fluid $m_1+m_2$ is cooled via the first recuperator Recup1 and subsequently directed to a condenser C (e.g., state 6) for additional cooling, after which it ultimately enters the working fluid pump 9 (e.g., state 1) where the cycle starts anew.

Referring now to FIGS. 9-14, the exemplary mass management systems 110, 700, 800 described herein may also be applicable to parallel-type thermodynamic cycles, and fluidly coupled thereto via the tie-in points A, B, and/or C to increase system performance. As with the cascade cycles shown in FIGS. 4-7, some reference numbers shown in FIGS. 9-14 may be similar to those in FIGS. 1A-1D, 7, and 8 to indicate similar components that will not be described again in detail.

Figure 10:
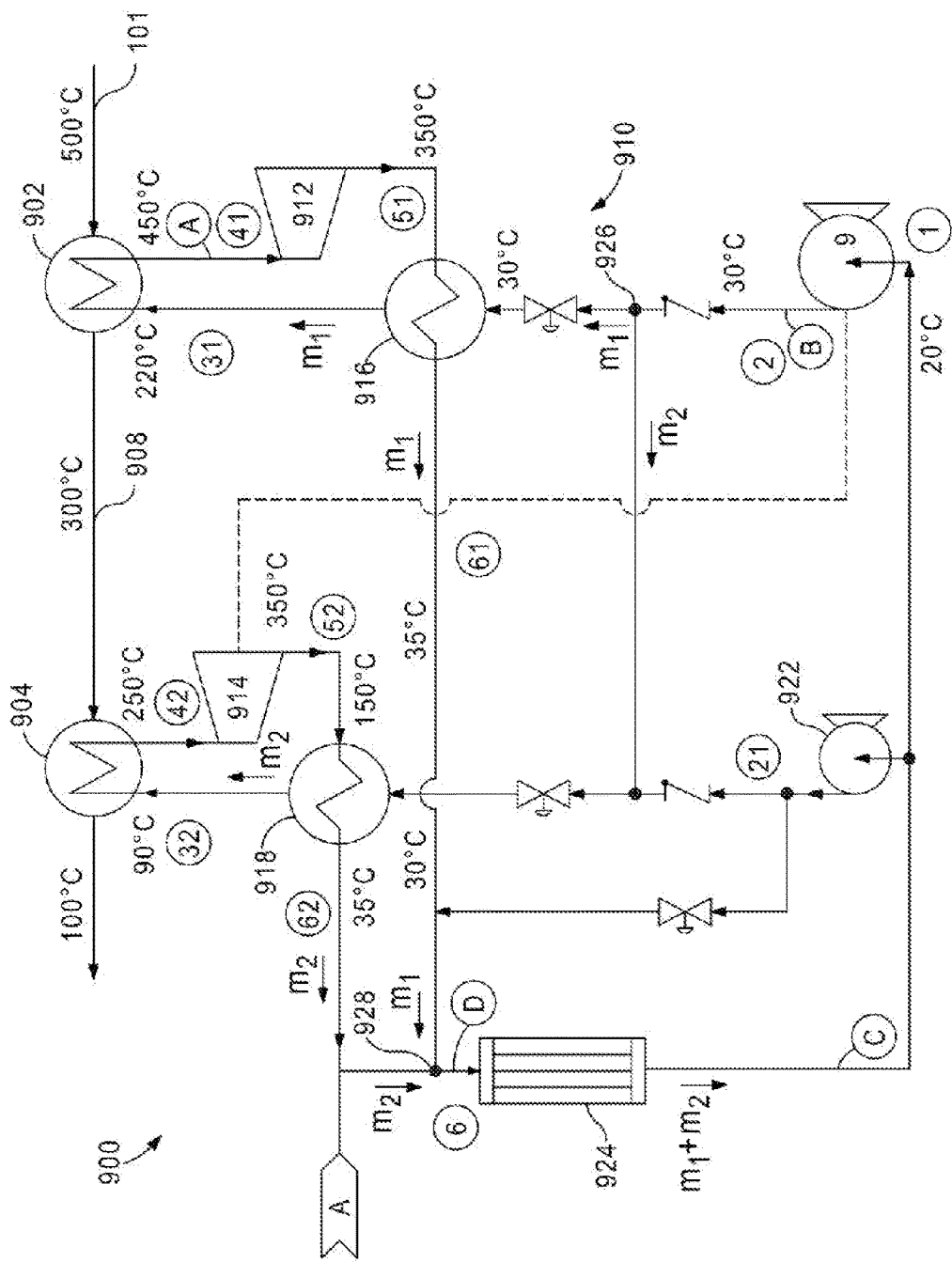
FIGS. 10-15 schematically illustrate various embodiments of parallel heat engine cycles, according to one or more embodiments disclosed.

Referring to FIG. 10, an exemplary parallel thermodynamic cycle 900 is shown and may be used to convert thermal energy to work by thermal expansion of the working fluid flowing through a working fluid circuit 910. As with prior-disclosed embodiments, the working fluid circulated in the working fluid circuit 910, and the other exemplary circuits described below, may be carbon dioxide (carbon dioxide). The cycle 900 may be considered as a Rankine cycle implemented as a heat engine device including multiple heat exchangers that are in fluid communication with a waste heat source 101. Moreover, the cycle 900 may further include multiple turbines for power generation and/or pump driving power, and multiple recuperators located downstream of and fluidly coupled to the turbine(s).

Specifically, the working fluid circuit 910 may be in thermal communication with the waste heat source 101 via a first heat exchanger 902 and a second heat exchanger 904. The first and second heat exchangers 902, 904 may correspond generally to the heat exchanger 5 described above with reference to FIG. 1A. It will be appreciated that any number of heat exchangers may be utilized in conjunction with one or more heat sources. The first and second heat exchangers 902, 904 may be waste heat exchangers. In at least one embodiment, the first and second heat exchangers 902, 904 may be first and second stages, respectively, of a single or combined waste heat exchanger.

The first heat exchanger 902 may serve as a high temperature heat exchanger (e.g., high temperature with respect to the second heat exchanger 904) adapted to receive an initial or primary flow of thermal energy from the heat source 101. In various embodiments, the initial temperature of the heat source 101 entering the cycle 900 may range from about 400° F. to greater than about 1,200° F. (e.g., about 204° C. to greater than about 650° C.). In the illustrated embodiment, the initial flow of the heat source 101 may have a temperature of about 500° C. or higher. The second heat exchanger 904 may then receive the heat source 101 via a serial connection 908 downstream from the first heat exchanger 902. In one embodiment, the temperature of the heat source 101 provided to the second heat exchanger 904 may be reduced to about 250-300° C.

The heat exchangers 902, 904 are arranged in series in the heat source 101, but in parallel in the working fluid circuit 910. The first heat exchanger 902 may be fluidly coupled to a first turbine 912 and the second heat exchanger 904 may be fluidly coupled to a second turbine 914. In turn, the first turbine 912 may also be fluidly coupled to a first recuperator 916 and the second turbine 914 may also be fluidly coupled to a second recuperator 918. One or both of the turbines 912, 914 may be a power turbine configured to provide electrical power to auxiliary systems or processes. The recuperators 916, 918 may be arranged in series on a low temperature side of the circuit 910 and in parallel on a high temperature side of the circuit 910.

The pump 9 may circulate the working fluid throughout the circuit 910 and a second, starter pump 922 may also be in fluid communication with the components of the fluid circuit 910. The first and second pumps 9, 922 may be turbopumps, motor-driven pumps, or combinations thereof. In one embodiment, the first pump 9 may be used to circulate the working fluid during normal operation of the cycle 900 while the second pump 922 may be nominally driven and used generally for starting the cycle 900. In at least one embodiment, the second turbine 914 may be used to drive the first pump 9, but in other embodiments the first turbine 912 may be used to drive the first pump 9, or the first pump 9 may be nominally driven by an external or auxiliary machine (not shown).

The first turbine 912 may operate at a higher relative temperature (e.g., higher turbine inlet temperature) than the second turbine 914, due to the temperature drop of the heat source 101 experienced across the first heat exchanger 902. In one or more embodiments, however, each turbine 912, 914 may be configured to operate at the same or substantially the same inlet pressure. This may be accomplished by design and control of the circuit 910, including but not limited to the control of the first and second pumps 9, 922 and/or the use of multiple-stage pumps to optimize the inlet pressures of each turbine 912, 914 for corresponding inlet temperatures of the circuit 910. This is also accomplished through the use of one of the exemplary MMS 110, 700, or 800 that may be fluidly coupled to the circuit 910 at tie-in points A, B, and/or C, whereby the MMS 110, 700, or 800 regulates the working fluid pressure in order to maximize power outputs.

The working fluid circuit 910 may further include a condenser 924 in fluid communication with the first and second recuperators 916, 918. The low-pressure discharge working fluid flow exiting each recuperator 916, 918 may be directed through the condenser 924 to be cooled for return to the low temperature side of the circuit 910 and to either the first or second pumps 9, 922.

In operation, the working fluid is separated at point 926 in the working fluid circuit 910 into a first mass flow $m_1$ and a second mass flow $m_2$. The first mass flow $m_1$ is directed through the first heat exchanger 902 and subsequently expanded in the first turbine 912. Following the first turbine 912, the first mass flow $m_1$ passes through the first recuperator 916 in order to transfer residual heat back to the first mass flow $m_1$ as it is directed toward the first heat exchanger 902. The second mass flow $m_2$ may be directed through the second heat exchanger 904 and subsequently expanded in the second turbine 914. Following the second turbine 914, the second mass flow $m_2$ passes through the second recuperator 918 to transfer residual heat back to the second mass flow $m_2$ as it is directed toward the second heat exchanger 904. The second mass flow $m_2$ is then re-combined with the first mass flow $m_1$ at point 928 to generate a combined mass flow $m_1+m_2$. The combined mass flow $m_1+m_2$ may be cooled in the condenser 924 and subsequently directed back to the pump 9 to commence the fluid loop anew.

Figure 11:
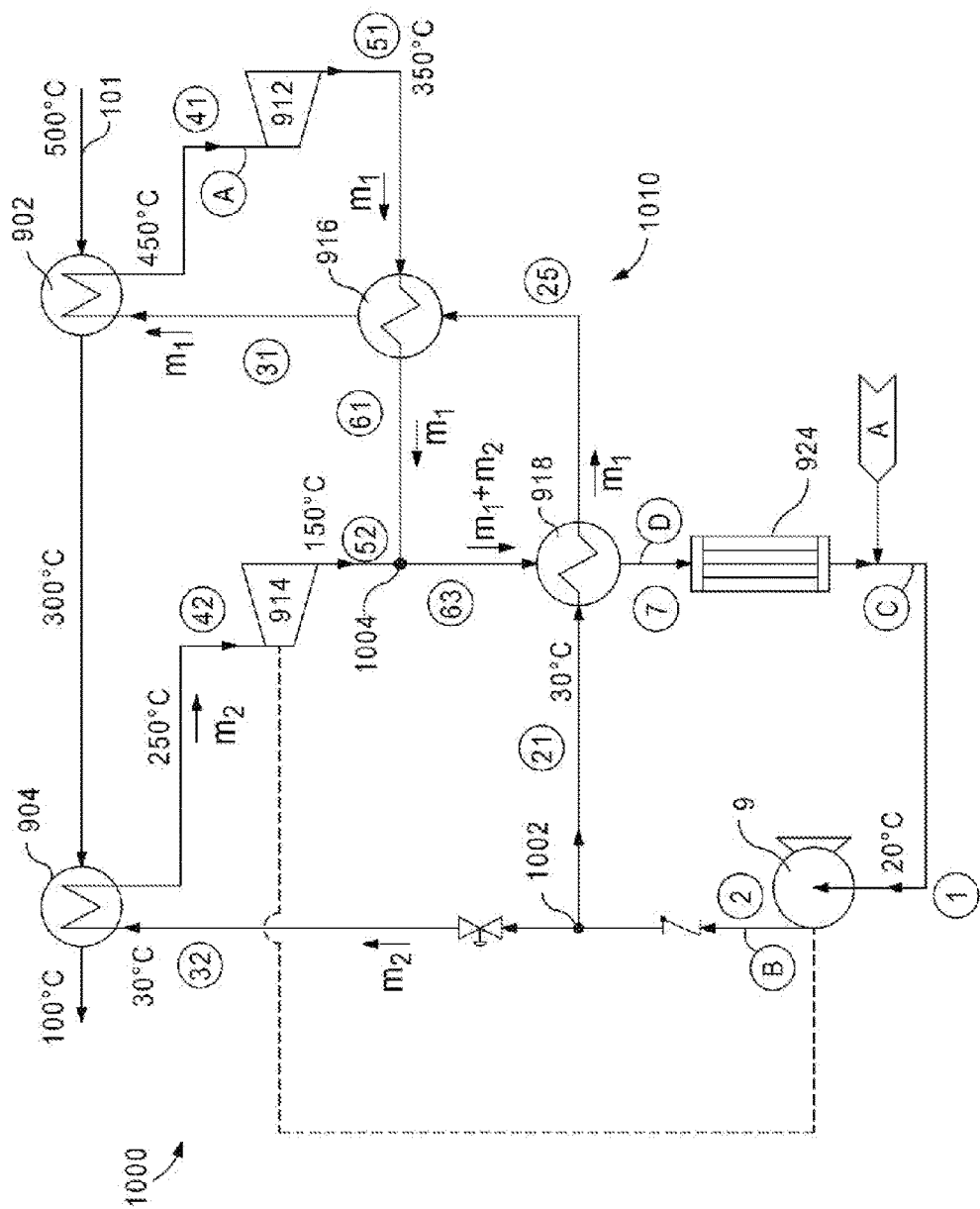

FIG. 11 illustrates another exemplary parallel thermodynamic cycle 1000, according to one or more embodiments, where one of the MMS 110, 700, and/or 800 may be fluidly coupled thereto via tie-in points A, B, and/or C to regulate working fluid pressure for maximizing power outputs. The cycle 1000 may be similar in some respects to the thermodynamic cycle 900 described above with reference to FIG. 10. Accordingly, the thermodynamic cycle 1000 may be best understood with reference to FIG. 10, where like numerals correspond to like elements that will not be described again in detail. The cycle 1000 includes the first and second heat exchangers 902, 904 again arranged in series in thermal communication with the heat source 101, and arranged in parallel within a working fluid circuit 1010.

In the circuit 1010, the working fluid is separated into a first mass flow $m_1$ and a second mass flow $m_2$ at a point 1002. The first mass flow $m_1$ is eventually directed through the first heat exchanger 902 and subsequently expanded in the first turbine 912. The first mass flow $m_1$ then passes through the first recuperator 916 to transfer residual thermal energy back to the first mass flow $m_1$ that is coursing past state 25 and into the first recuperator 916. The second mass flow $m_2$ may be directed through the second heat exchanger 904 and subsequently expanded in the second turbine 914. Following the second turbine 914, the second mass flow $m_2$ is merged with the first mass flow $m_1$ at point 1004 to generate the combined mass flow $m_1+m_2$. The combined mass flow $m_1$-$m_2$ may be directed through the second recuperator 918 to transfer residual thermal energy to the first mass flow $m_1$ as it passes through the second recuperator 918 on its way to the first recuperator 916.

The arrangement of the recuperators 916, 918 allows the residual thermal energy in the combined mass flow $m_1+m_2$ to be transferred to the first mass flow $m_1$ in the second recuperator 918 prior to the combined mass flow $m_1+m_2$ reaching the condenser 924. As can be appreciated, this may increase the thermal efficiency of the working fluid circuit 1010 by providing better matching of the heat capacity rates, as defined above.

In one embodiment, the second turbine 914 may be used to drive (shown as dashed line) the first or main working fluid pump 9. In other embodiments, however, the first turbine 912 may be used to drive the pump 9. The first and second turbines 912, 914 may be operated at common turbine inlet pressures or different turbine inlet pressures by management of the respective mass flow rates at the corresponding states 41 and 42.

Figure 12:
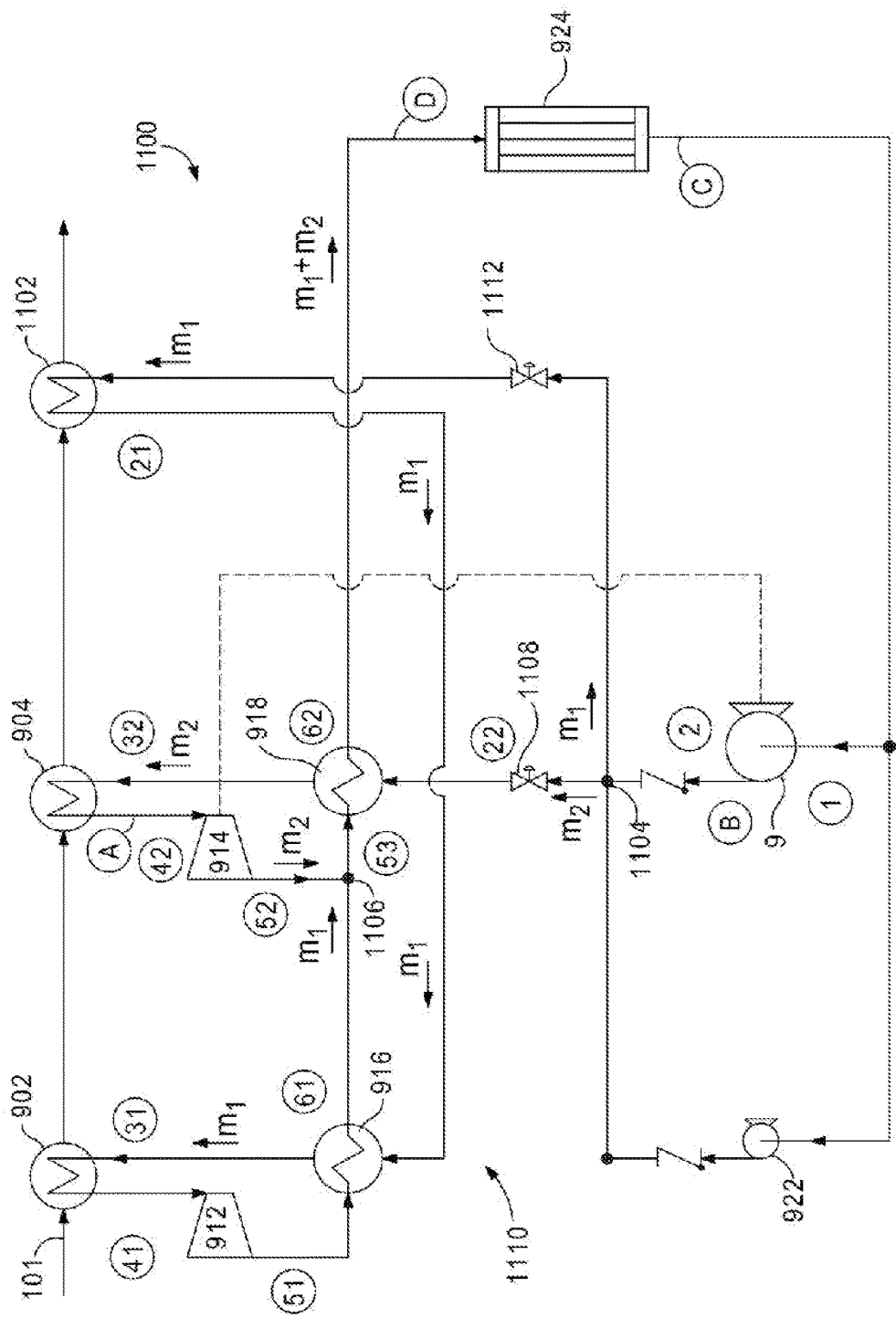

FIG. 12 illustrates another embodiment of a parallel thermodynamic cycle 1100, according to one or more embodiments, where one of the MMS 110, 700, and/or 800 may be fluidly coupled thereto via tie-in points A, B, and/or C to regulate working fluid pressure for maximizing power outputs. The cycle 1100 may be similar in some respects to the thermodynamic cycles 900 and 1000 and therefore may be best understood with reference to FIGS. 9 and 10, where like numerals correspond to like elements that will not be described again. The thermodynamic cycle 1100 may include a working fluid circuit 1110 utilizing a third heat exchanger 1102 in thermal communication with the heat source 101. The third heat exchanger 1102 may similar to the first and second heat exchangers 902, 904, as described above.

The heat exchangers 902, 904, 1102 may be arranged in series in thermal communication with the heat source 101, and arranged in parallel within the working fluid circuit 1110. The corresponding first and second recuperators 916, 918 are arranged in series on the low temperature side of the circuit 1110 with the condenser 924, and in parallel on the high temperature side of the circuit 1110. After the working fluid is separated into first and second mass flows $m_1$, $m_2$ at point 1104, the third heat exchanger 1102 may be configured to receive the first mass flow $m_1$ and transfer thermal energy from the heat source 101 to the first mass flow $m_1$. Accordingly, the third heat exchanger 1102 may be adapted to initiate the high temperature side of the circuit 1110 before the first mass flow $m_1$ reaches the first heat exchanger 902 and the first turbine 912 for expansion therein. Following expansion in the first turbine 912, the first mass flow $m_1$ is directed through the first recuperator 916 to transfer residual thermal energy to the first mass flow $m_1$ discharged from the third heat exchanger 1102 and coursing toward the first heat exchanger 902.

The second mass flow $m_2$ is directed through the second heat exchanger 904 and subsequently expanded in the second turbine 914. Following the second turbine 914, the second mass flow $m_2$ is merged with the first mass flow $m_1$ at point 1106 to generate the combined mass flow $m_1+m_2$ which provides residual thermal energy to the second mass flow $m_2$ in the second recuperator 918 as the second mass flow $m_2$ courses toward the second heat exchanger 904. The working fluid circuit 1110 may also include a throttle valve 1108, such as a pump-drive throttle valve, and a shutoff valve 1112 to manage the flow of the working fluid.

Figure 13:
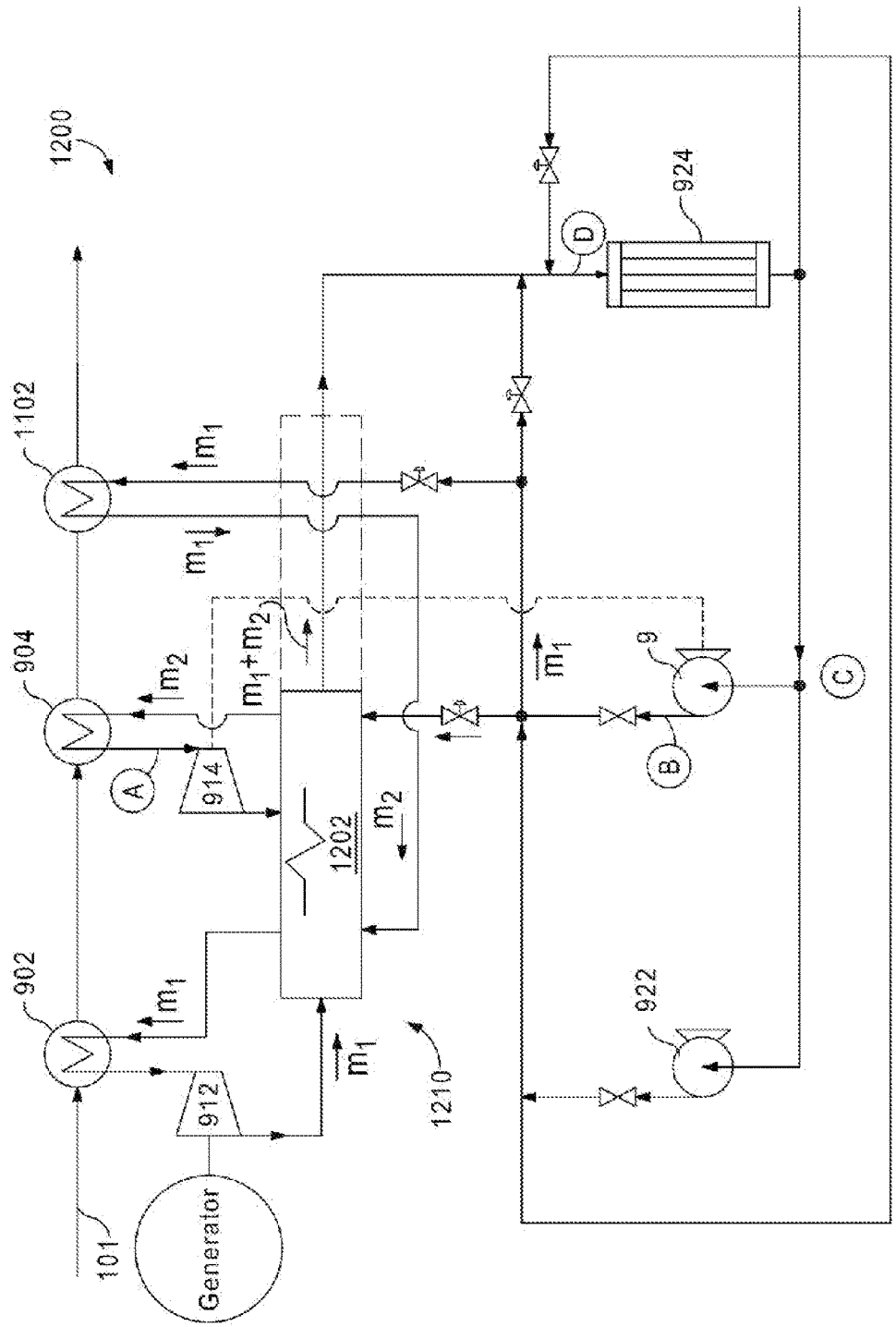

FIG. 13 illustrates another embodiment of a parallel thermodynamic cycle 1200, according to one or more embodiments disclosed, where one of the MMS 110, 700, and/or 800 may be fluidly coupled thereto via tie-in points A, B, and/or C to regulate working fluid pressure for maximizing power outputs. The cycle 1200 may be similar in some respects to the thermodynamic cycles 900, 1000, and 1100, and as such, the cycle 1200 may be best understood with reference to FIGS. 9-11 where like numerals correspond to like elements that will not be described again. The thermodynamic cycle 1200 may include a working fluid circuit 1210 where the first and second recuperators 916, 918 are combined into or otherwise replaced with a single, combined recuperator 1202. The recuperator 1202 may be of a similar type as the recuperators 916, 918 described herein, or may be another type of recuperator or heat exchanger known in the art.

As illustrated, the combined recuperator 1202 may be configured to transfer heat to the first mass flow $m_1$ before it enters the first heat exchanger 902 and receive heat from the first mass flow $m_1$ after it is discharged from the first turbine 912. The combined recuperator 1202 may also transfer heat to the second mass flow $m_2$ before it enters the second heat exchanger 904 and also receive heat from the second mass flow $m_2$ after it is discharged from the second turbine 914. The combined mass flow $m_1+m_2$ flows out of the recuperator 1202 and to the condenser 924 for cooling.

As indicated by the dashed lines extending from the recuperator 1202, the recuperator 1202 may be enlarged or otherwise adapted to accommodate additional mass flows for thermal transfer. For example, the recuperator 1202 may be adapted to receive the first mass flow $m_1$ before entering and after exiting the third heat exchanger 1102. Consequently, additional thermal energy may be extracted from the recuperator 1202 and directed to the third heat exchanger 1102 to increase the temperature of the first mass flow $m_1$.

Figure 14:
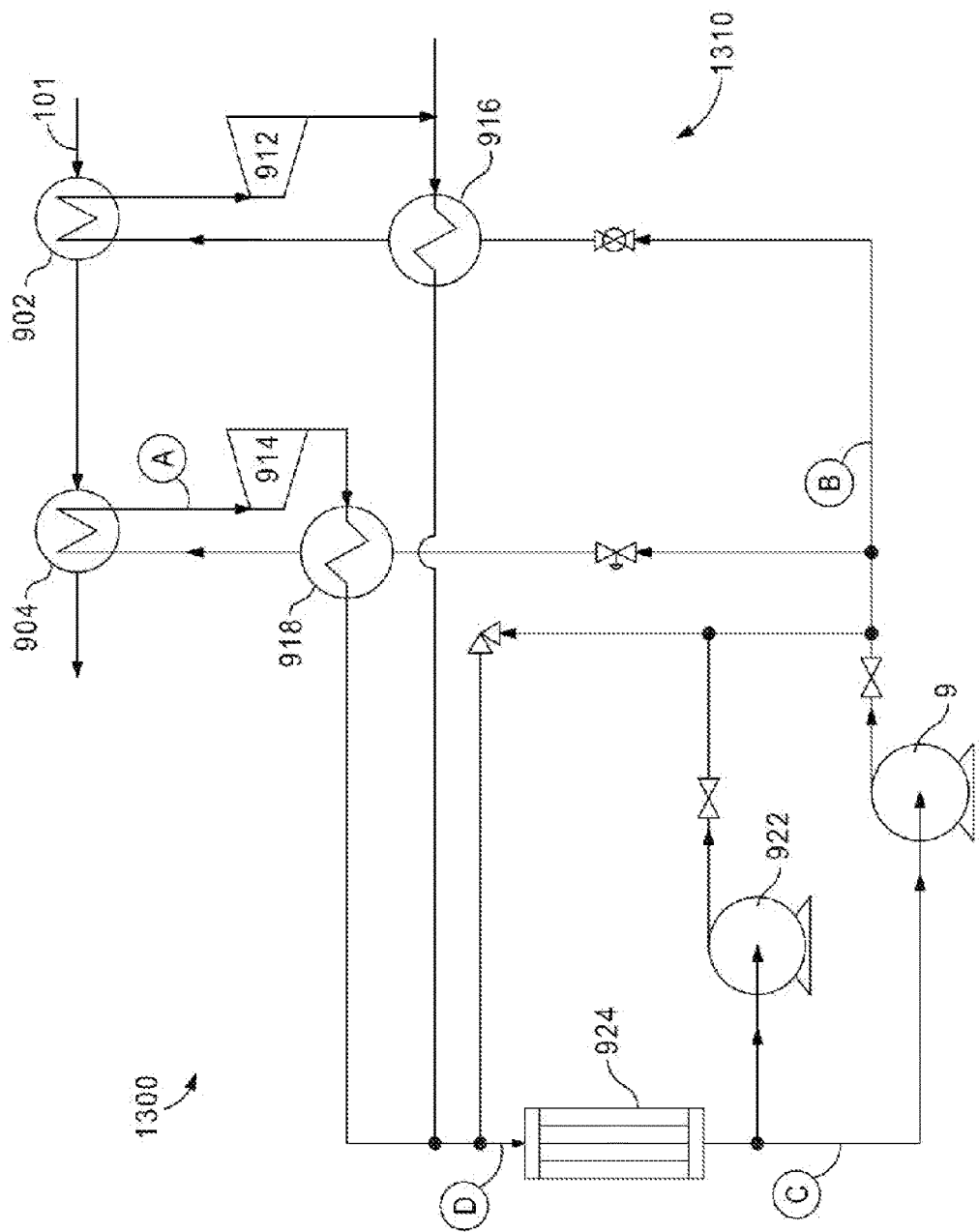

FIG. 14 illustrates another embodiment of a parallel thermodynamic cycle 1300 according to the disclosure, where one of the MMS 110, 700, and/or 800 may be fluidly coupled thereto via tie-in points A, B, and/or C to regulate working fluid pressure for maximizing power outputs. The cycle 1300 may be similar in some respects to the thermodynamic cycle 900, and as such, may be best understood with reference to FIG. 10 above where like numerals correspond to like elements that will not be described again in detail. The thermodynamic cycle 1300 may have a working fluid circuit 1310 substantially similar to the working fluid circuit 910 of FIG. 10 but with a different arrangement of the first and second pumps 9, 922.

Figure 15:
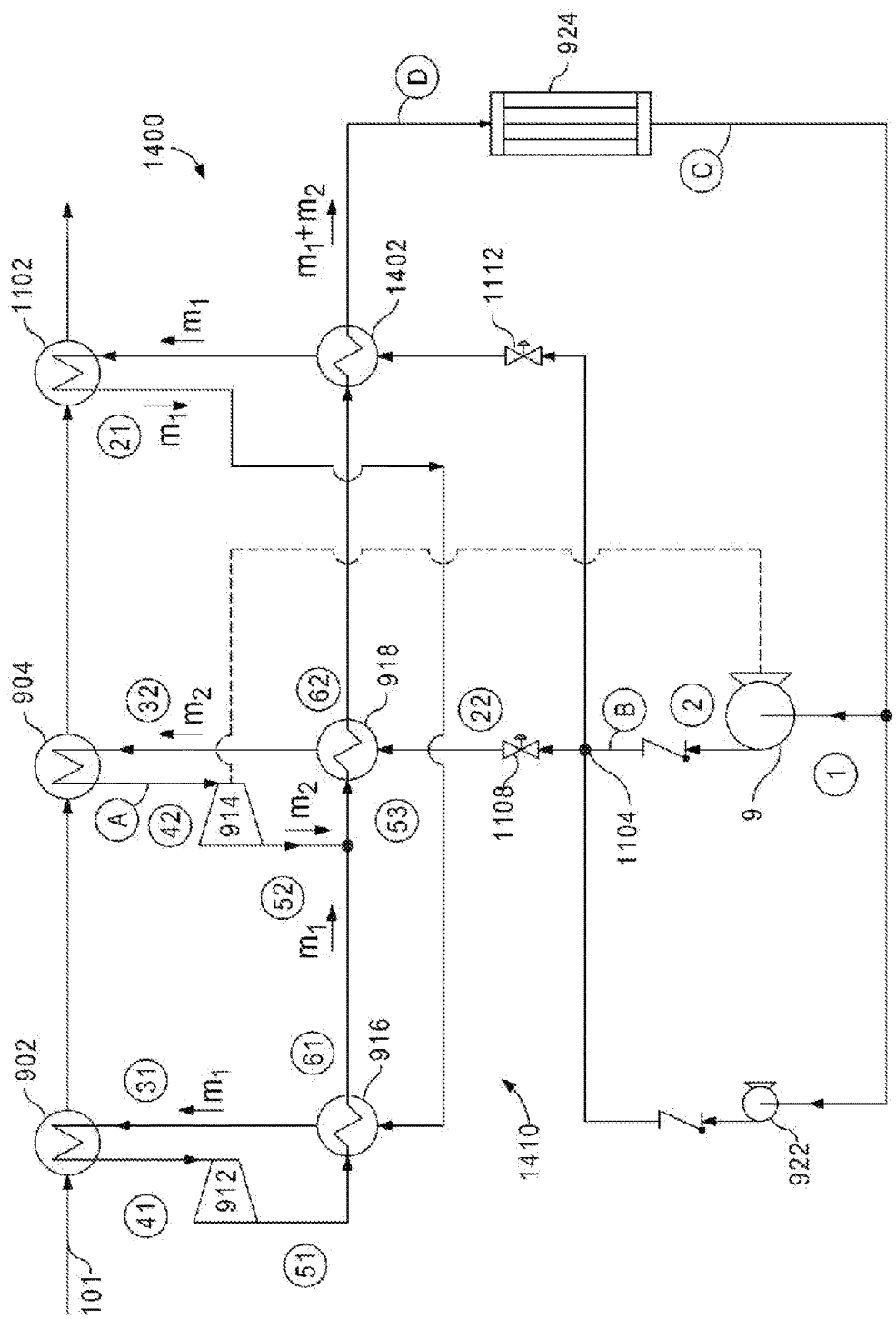

FIG. 15 illustrates another embodiment of a parallel thermodynamic cycle 1400 according to the disclosure, where one of the MMS 110, 700, and/or 800 may be fluidly coupled thereto via tie-in points A, B, and/or C to regulate working fluid pressure for maximizing power outputs. The cycle 1400 may be similar in some respects to the thermodynamic cycle 1100, and as such, may be best understood with reference to FIG. 12 above where like numerals correspond to like elements that will not be described again. The thermodynamic cycle 1400 may have a working fluid circuit 1410 substantially similar to the working fluid circuit 1110 of FIG. 12 but with the addition of a third recuperator 1402 adapted to extract additional thermal energy from the combined mass flow $m_1+m_2$ discharged from the second recuperator 918. Accordingly, the temperature of the first mass flow $m_1$ entering the third heat exchanger 1102 may be preheated prior to receiving residual thermal energy transferred from the heat source 101.

As illustrated, the recuperators 916, 918, 1402 may operate as separate heat exchanging devices. In other embodiments, however, the recuperators 916, 918, 1402 may be combined into a single recuperator, similar to the recuperator 1202 described above with reference to FIG. 13.

Each of the described cycles 900-1400 from FIGS. 9-14 may be implemented in a variety of physical embodiments, including but not limited to fixed or integrated installations, or as a self-contained device such as a portable waste heat engine "skid". The exemplary waste heat engine skid may arrange each working fluid circuit 910-1410 and related components (e.g., turbines 912, 914, recuperators 916, 918, 1202, 1402, condenser 924, pumps 9, 922) into a consolidated, single unit. An exemplary waste heat engine skid is described and illustrated in commonly assigned U.S. application Ser. No. 12/631,412, entitled "Thermal Energy Conversion Device", filed on Dec. 9, 2009, and published as US 2011-0185729, wherein the contents are hereby incorporated by reference to the extent consistent with the present disclosure.

The mass management systems 110, 700, and 800 described herein provide and enable: i) independent control suction margin at the inlet of the pump 9, which enables the use of a low-cost, high-efficiency centrifugal pump, through a cost effective set of components; ii) mass of working fluid of different densities to be either injected or withdrawn (or both) from the system at different locations in the cycle based on system performance; and iii) centralized control by a mass management system operated by control software with inputs from sensors in the cycle and functional control over the flow of mass into and out of the system.

It is to be understood that the present disclosure describes several exemplary embodiments for implementing different features, structures, or functions of the invention. Exemplary embodiments of components, arrangements, and configurations are described herein to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the present disclosure may include embodiments in which the first and second features are formed in direct contact, and may also include embodiments in which additional features may be formed interposing the first and second features, such that the first and second features may not be in direct contact. Finally, the exemplary embodiments described herein may be combined in any combination of ways, i.e., any element from one exemplary embodiment may be used in any other exemplary embodiment without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including", "containing", and "comprising" are used in an open-ended fashion, and thus should be interpreted to mean "including, but not limited to". All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B", unless otherwise expressly specified herein.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A system for pressure regulation of a heat engine, comprising:
    a pump fluidly coupled to a working fluid circuit and configured to circulate a working fluid in the working fluid circuit;
    a first pressure sensor arranged at or adjacent to an inlet of the pump and configured to detect pressure of the working fluid at or adjacent to the inlet of the pump;
    a second pressure sensor arranged at or adjacent to an outlet of the pump and configured to detect pressure of the working fluid at or adjacent to the outlet of the pump;
    a mass management system comprising a mass control tank configured to store additional working fluid, the mass management system fluidly coupled to the working fluid circuit and configured to selectively direct a flow of the working fluid into or out of the working fluid circuit based on the pressure detected by the first pressure sensor;
    a mass control tank sensor operatively connected to the mass control tank and configured to detect pressure of the working fluid within the mass control tank;
    a first valve fluidly coupling the mass control tank to the outlet of the pump; and
    a second valve fluidly coupling the mass control tank to the inlet of the pump,
    wherein the first valve is configured to open when the pressure detected by the mass control tank sensor is less than the pressure detected by the first pressure sensor.

2. The system of claim 1, wherein the second valve is configured to open when the pressure detected by the mass control tank sensor is greater than the pressure detected by the first pressure sensor.

3. A system for pressure regulation of a heat engine, comprising:
    a pump fluidly coupled to a working fluid circuit and configured to circulate working fluid in the working fluid circuit;
    a mass control tank fluidly coupled to the working fluid circuit and configured to store working fluid;
    a micro-processor controller operatively connected to the mass control tank and configured to execute a program to regulate the flow of the working fluid to and from the mass control tank based on a pressure detected at or adjacent to an inlet of the pump;
    a first valve fluidly coupling the mass control tank to an outlet of the pump; and
    a second valve fluidly coupling the mass control tank to the inlet of the pump,
    wherein the micro-processor controller is configured to execute a program to open the first valve when the pressure detected in the mass control tank is less than the pressure detected at or adjacent to the inlet of the pump.

4. The system of claim 3, wherein the micro-processor controller is configured to execute a program to open the second valve when the pressure detected in the mass control tank is greater than the pressure detected at or adjacent to the outlet of the pump.

5. A mass management system, comprising:
    a mass control tank fluidly coupled to a working fluid circuit and configured to store working fluid;
    a first pressure sensor configured to detect a pressure at or adjacent to an inlet of a pump fluidly coupled to the working fluid circuit and configured to circulate the working fluid in the working fluid circuit;
    a micro-processor controller operatively connected to the first pressure sensor and configured to execute a program to direct the working fluid into and out of the mass control tank based on the pressure detected by the first pressure sensor;
    a mass control tank sensor operatively connected to the micro-processor controller and configured to detect a pressure of the working fluid within the mass control tank;
    a second pressure sensor operatively connected to the micro-processor controller and configured to detect a pressure of the working fluid at or adjacent to an outlet of the pump;
    a first valve fluidly coupling the mass control tank to the outlet of the pump; and
    a second valve fluidly coupling the mass control tank to the inlet of the pump,
    wherein the micro-processor controller is configured to execute a program to open the first valve when the pressure detected by the mass control tank sensor is less than the pressure detected by the first pressure sensor.

6. The mass management system of claim 5, wherein the micro-processor controller is configured to execute a program to open the second valve when the pressure detected by the mass control tank sensor is greater than the pressure detected by the first pressure sensor.

* * * * *